United States Patent [19]

Nagaoka

[11] Patent Number: 5,841,586

[45] Date of Patent: Nov. 24, 1998

[54] OPTICAL SYSTEM

[75] Inventor: Toshiyuki Nagaoka, Akishima, Japan

[73] Assignee: Olympus Optical Co., Ltd., Tokyo, Japan

[21] Appl. No.: 820,131

[22] Filed: Mar. 19, 1997

[30] Foreign Application Priority Data

Sep. 4, 1996 [JP] Japan .................................. 8-252238

[51] Int. Cl.$^6$ ...................................................... G02B 3/00
[52] U.S. Cl. ............................................................ 359/654
[58] Field of Search .................................. 354/652, 653, 354/654

[56] References Cited

U.S. PATENT DOCUMENTS 4,784,478  11/1988  Takada ..................................... 359/654
5,059,005  10/1991  Kawano ................................... 359/654

FOREIGN PATENT DOCUMENTS 1-223408   9/1989  Japan .
1-246517  10/1989  Japan .
5-093852   4/1993  Japan .

*Primary Examiner*—Scott J. Sugarman
*Attorney, Agent, or Firm*—Cushman Darby Cushman IP Group of Pillsbury Madison & Sutro LLP

[57] ABSTRACT

An optical system comprising a radial type gradient index lens component which has a refractive index distribution in a radial direction from an optical axis in a medium thereof, and configured to correct chromatic aberration sufficiently favorably by selecting a difference between a partial dispersion ratio on the optical axis and that on an effective diameter when a gradient of the distribution of the radial type gradient index lens component is different dependently on wavelengths.

18 Claims, 14 Drawing Sheets

OPTICAL SYSTEM

BACKGROUND OF THE INVENTION a) Field of the invention

The present invention relates mainly to an optical system which is used under a light source emitting rays having multiple wavelengths.

b) Description of the prior art

A radial type gradient index lens component which has a refractive index distribution from an optical axis in a radial direction has freedom for correction of aberrations larger than that of a homogeneous lens component and is therefore usable for reducing a number of lens components required for composing an optical system and enhancing imaging performance thereof. The radial type gradient index lens component has an excellent characteristic for correcting chromatic aberration and there are known a large number of conventional examples which use radial type gradient index lens components in optical systems such as cameras and microscopes used under white or multi-wavelength light sources.

However, most of the conventional examples using the radial type gradient index lens components pay consideration only to correction of chromatic aberration at the three wavelengths of the primary spectra, i.e., the d-line, F-line and C-line or pay no consideration to correction of aberration at the four wavelengths including that of the g-line.

It is strongly demanded to correct chromatic aberration within a wide wavelength region covering the short wavelength of the g-line in optical systems such as microscopes, video cameras and silver salt cameras.

As conventional examples of optical systems which use radial type gradient index lens component disclosed with description of correction of chromatic aberration at the wavelength of the g-line, are known optical systems disclosed by Japanese Patents Kokai Publication No. Hei 1-223408 and No. Hei 1-246517.

However, these conventional examples describe correction of chromatic aberration which is produced by media only at two wavelengths of the d-line and the g-line, but pay no consideration to chromatic aberration at the four wavelengths of the d-line, C-line, F-line and g-line.

Further, Japanese Patent Kokai Publication No. Hei 5-93852 discloses a radial type gradient index lens component while describing the g-line, but this radial type gradient index lens component is a filter which is used for correcting distortion, has a refractive power of nearly zero, and can hardly apply to a variety of optical systems for favorable correction of chromatic aberration therein.

SUMMARY OF THE INVENTION

A primary object of the present invention is to provide an optical system which is used under a white or multi-wavelength light sources and has chromatic aberration corrected favorably within a wavelength region covering the wavelength of the g-line.

The optical system according to the present invention uses a radial type gradient index lens component which has a refractive index distribution in a radial direction from an optical axis in a medium thereof and satisfies the condition (1) mentioned below when the radial type gradient index lens component has a refractive index which varies dependently on wavelengths:

$$\Delta\theta_{gF} < 5 \tag{1}$$

DETAILED DESCRIPTION OF THE PREFERRED EMBODIMENTS

The optical system according to the present invention uses a radial type gradient index lens component which has a refractive index distribution in a radial direction from an optical axis and is characterized in that the radial type gradient index lens component satisfies the following condition (1):

$$\Delta\theta_{gF} < 0.5 \tag{1}$$

wherein the reference symbol $\Delta\theta_{gF}$ represents a value which is expressed by the following formula (b):

$$\Delta\theta_{gF} = |\theta_{gF}(D_e) - \theta_{gF}(0)| \tag{b}$$

wherein the reference symbols $\theta_{gF}(D_e)$ and $\theta_{gF}(0)$ represent a partial dispersion ratio on an effective diameter ($r=D_e$) and a partial dispersion ratio on the optical axis ($r=0$) respectively of the radial type gradient index lens component which are given by the following formula (c):

$$\theta_{gF}(r) = |n_g(r) - n_F(r)| / |n_F(r) - n_C(r)| \tag{c}$$

wherein the reference symbols $n_g(r)$, $n_F(r)$ and $n_C(r)$ represent refractive indices for the g-line, F-line and C-line at a point located at a radial distance of r from the optical axis.

The condition (1) mentioned above is required for correcting chromatic aberration favorably in an optical system which is to be used within a broad wavelength region. When this condition (1) is satisfied, it is possible to correct chromatic aberration within a broad wavelength region.

A radial gradient index lens element has a refractive index distribution which is axially symmetrical in the radial direction in a medium thereof and is capable of refracting rays in the medium in addition to refraction by surfaces thereof. Accordingly, the radial type gradient index lens element has freedom for correction of aberrations which is larger than that of a homogeneous lens element and an excellent capability to correct chromatic aberration. Therefore, let us consider correction of chromatic aberration at the four wavelengths of the d-line, C-line, F-line and g-line with a radial type gradient index lens element while considering chromatic aberration to be produced by a medium and surfaces thereof.

By approximating a refractive index distribution of a medium of a radial type gradient index lens element, we obtain:

$$n\lambda(r) = \Sigma N_{i\lambda} r^{2i} \tag{a}$$

wherein the reference symbol r represents a distance as measured from the optical axis in the radial direction, the reference symbol $n\lambda(r)$ designates a refractive index of a point located at the distance r at a given wavelength $\lambda$, or $n_d(r)$, for example, designates a refractive index of a point located at the radial distance r at the wavelength of the d-line, and the reference symbol $N_i\lambda$ denotes a refractive index distribution coefficient of the 2i'th order at the wavelength $\lambda$, or $N_{1d}$, for example, denotes a refractive index distribution coefficient of the second order at the wavelength of d-line.

Figure 20:
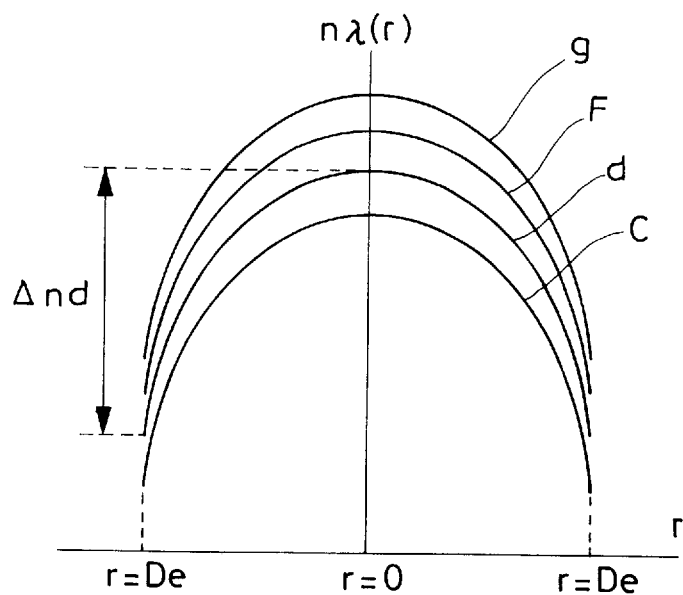
FIG. 20 shows a diagram illustrating an example of refractive index distribution of a gradient index lens component.

A refractive index distribution is exemplified in FIG. 20, wherein refractive indices are taken as the ordinate, distances as measured from the optical axis are taken as the abscissa and the curves d, F, C and g represent variations of refractive indices of the point located at the radial distance of r for the d-line, F-line, C-line and g-line respectively. Further, the reference symbols De represents an effective diameter of the radial type gradient index lens element and the reference symbol $\Delta n\lambda$ designates a difference in refractive index between the optical axis and the effective diameter at the given wavelength $\lambda$. Furthermore, a gradient of the refractive index distribution (a gradient of each curve) represents a degree of a variation of a refractive index from the optical axis toward a magninal portion and a gradients which varies dependently on wavelengths mean that the refractive index distribution coefficient $N_1$ used in the formula (a) expressing refractive index distribution has a value which varies dependently on wavelengths, or that $N_{1d}$, $N_{1C}$, $N_{1F}$ and $N_{1g}$ have values which are different from one another. If it is supposed that gradients of the refractive index distributions at different wavelengths are coincident with one another, focal lengths of a medium are coincident with one another at different wavelengths, whereby no chromatic aberration will be produced. Under the current circumstances of practical manufacturing technique for gradient index materials, however, a gradient of a refractive index distribution ordinarily varies dependently on wavelengths and can hardly be coincident with one another.

Even when a gradient of a refractive index distribution varies dependently on wavelengths, the present invention makes it possible to correct chromatic aberration within an allowable range by configuring a radial type gradient index lens component so as to satisfy the condition (1) mentioned above.

Figure 21:
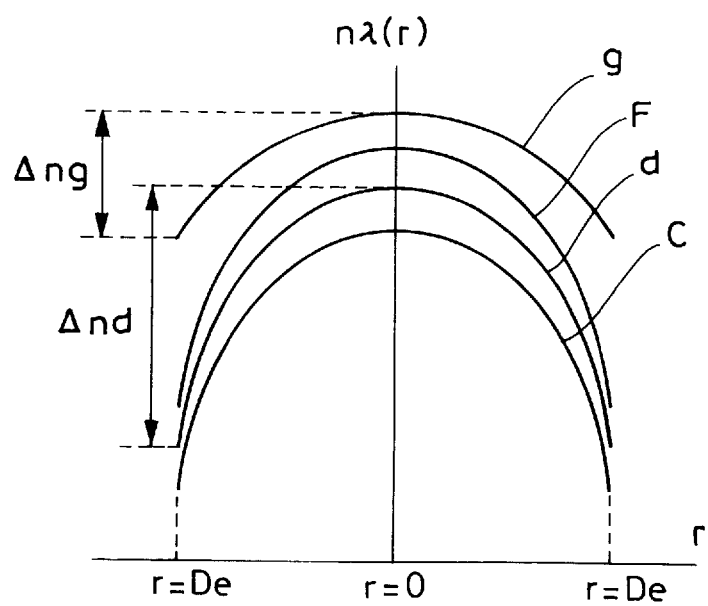
FIG. 21 shows a diagram illustrating another example of refractive index distribution of a radial type gradient index lens component.

Now, description will be made of a condition required for favorably correcting a secondary spectrum. For favorably correcting the secondary spectrum at the four wavelengths of the d-line, C-line, F-line and g-line in an independent radial type gradient index lens element or an optical system using a radial type gradient index lens element, it is necessary that a gradient of refractive index does not vary so remarkably dependently on wavelengths. When a refractive index at the wavelength of the g-line is largely different from refractive indices at the wavelengths of the d-line, C-line and F-line as shown in FIG. 21, for example, a focal length for the g-line is largely different from focal lengths for the d-line, C-line and F-line, thereby making it difficult to correct the secondary spectrum favorably. It is therefore necessary for correcting the secondary spectrum that the refractive indices at the different wavelengths are not extremely different from one another, or it is necessary to satisfy the condition (1) mentioned above.

$\theta_{gF}(r)$ represents a ratio of a refractive index for the g-line relative to a main dispersion which is a difference between refractive indices for the F-line and the C-line as expressed by the above-mentioned formula (c). When $\theta_{gF}(r)$ on an optical axis has a value which is not largely different from a value of $\theta_{gF}(r)$ on a marginal portion, the gradient of the refractive index distribution for the g-line is not different extremely from those at the other wavelengths, thereby making it possible to correct the secondary spectrum favorably. For this reason, the condition (1) is adopted.

If the condition (1) is not satisfied, it will be difficult to favorably correct the secondary spectrum. Though a gradient of a refractive index distribution varies ordinarily dependently on wavelengths under the current circumstances of the practical manufacturing technique for gradient index materials, it is possible to favorably correct the secondary spectrum when the condition (1) is satisfied. The condition (1) is a requisite for correcting the secondary spectrum and a radial type gradient index lens element satisfying this condition is capable of correcting chromatic aberration independently in itself or in an optical system which uses this lens element.

Further, longitudinal chromatic aberration of the first order in a radial type gradient index lens component, i.e., chromatic aberration PAC of the d-line, C-line, and F-line and is expressed by the following formula (d):

$$PAC = K(\phi_s/V_0 + \phi_m/V_1) \tag{d}$$

wherein the reference symbol K represents a constant which is dependent on a height of an axial ray and an angle of a final paraxial ray, and a reference symbol $V_i$ designates a value expressing a fraction corresponding to a refractive index distribution coefficient of the 2i'th order: $V_0$ being given by a formula (e) shown below and $V_1$ being given by a formula (f) in which 1 is substituted for i. Further, the reference symbol $\phi_s$ denotes a refractive power of surface for the d-line of the radial type gradient index lens element considered as a thin lens and the reference symbol $\phi_m$ represents a refractive power of medium for the d-line of the radial type gradient index lens element which is approximated by a formula (g) shown below:

$$V_0 = (N_{0d} - 1)/(N_{0F} - N_{0C}) \tag{e}$$

$$V_1 = N_{id}/(N_{iF} - N_{iC}) (i=1,2,3 \ldots) \tag{f}$$

$$\phi_m \approx -2N_{1d} t_G \tag{g}$$

wherein the reference symbol $t_G$ represents thickness of the radial type gradient index lens component.

As clear from the formula (d), it is possible to control chromatic aberration to be produced to a desired value by selecting an adequate value for the denominator $V_1$ in the second term of this formula expressing chromatic aberration PAC to be produced by a medium.

Considering a condition for correcting chromatic aberration of the primary spectra, or at the three wavelengths of the d-line, C-line and F-line, it is desirable for a radial type gradient index lens component to satisfy the following condition (2):

$$-0.5 < 1/V_1 < 0.5 \tag{2}$$

When this condition (2) is satisfied, it is possible to favorably correct chromatic aberration of the first order. If the upper limit of 0.5 of the condition (2) is exceeded, chromatic aberration will be undercorrected. If the lower condition of −0.5 of the condition (2) is exceeded, in contrast, chromatic aberration will be overcorrected.

Then, let us consider correction of chromatic aberration PAC(g) at the three wavelengths of the d-line, g-line and F-line. Let us express this chromatic aberration PAC(g) as follows:

$$PAC(g) = K(\phi_s/V_0(g) + \phi_m/V_i(g)) \tag{d-1}$$

wherein the reference symbol $V_i(g)$ represents a value of dispersion in which the g-line is taken into consideration for a refractive index distribution coefficient of the 2i'th order: the reference symbol $V_0(g)$ being given by a formula (e-1) shown below and the reference symbol $V_i(g)$ being given by a formula (f-1) shown below when 1 is substituted for i:

$$V_0(g) = (N_{0d}-1)/(N_{0g}-N_{0F}) \tag{e-1}$$

$$V_i(g) = N_{id}/(N_{ig}-N_{iF}) \tag{f-1}$$

From the formula (d-1), it is desirable for correcting chromatic aberration at the three wavelengths of the d-line, F-line and g-line to satisfy the following condition (3):

$$-2 < 1/V_1(g) < 2 \tag{3}$$

When the condition (3) is satisfied, it is possible to correct chromatic aberration favorably at the three wavelengths of the d-line, F-line and g-line. If the upper limit of 2 of the condition (3) is exceeded, chromatic aberration will be undercorrected. If the lower limit of −2 of the condition (3) is exceeded, chromatic aberration will be overcorrected.

When the gradients of the refractive index distributions at the different wavelengths are the same, a medium produces chromatic aberration of nearly zero as described above. Under the current circumstance of the practical manufacturing technique for gradient index materials, however, the gradients of the refractive index distributions are different at the different wavelengths, or the distribution coefficient of the 2i'th order has a value which varies dependently on wavelengths, whereby the values of the distribution coefficients at the different wavelengths can hardly be matched with one another. When the condition (2) is satisfied, however, it is possible to correct chromatic aberration at the three wavelengths of the d-line, C-line and F-line, and when the condition (3) is satisfied, it is possible to correct chromatic aberration at the three wavelengths of the d-line, F-line and g-line. Accordingly, it is possible by satisfying the conditions (2) and (3) to favorably correct chromatic aberration at the four wavelengths of the d-line, C-line, F-line and g-line.

As clear from the formulae (d) and (d-1), it is necessary for favorably correcting chromatic aberration to take refractive powers of surface and medium of a radial type gradient index lens component into consideration, element as clear from the formulae (d) and (d-1).

Now, let us consider an imaginary glass material having a dispersion characteristic producing chromatic aberration which is the same as that produced by a radial type gradient index lens element.

Let us assume that the imaginary glass material and the radial type gradient index lens component satisfy the following formula (h-1) and (h-2):

$$\phi/\nu_{eFC} = \phi_s/V_0 + \phi_m/V_1 \tag{h-1}$$

$$\phi/\nu_{egF} = \phi_s/V_0(g) + \phi_m/V_1(g) \tag{h-2}$$

wherein $\nu_{eFC}$ and $\nu_{egF}$ are given by formulae (i-1) and (i-2) which express dispersion characteristics of the imaginary glass material and $\phi = \phi_m + \phi_s$.

$$\nu_{eFC} = (n_{ed}-1)/(n_{eF}-n_{eC}) \tag{i-1}$$

$$\nu_{egF} = (n_{ed}-1)/(n_{eg}-n_{eF}) \tag{i-2}$$

wherein the reference symbols $n_{ed}$, $n_{eC}$, $n_{eF}$ and $n_{eg}$ represent imaginary refractive indices of the imaginary glass material for the d-line, C-line, F-line and g-line respectively.

By calculating the dispersion characteristics of the imaginary dispersion characteristics by the formulae (h-1) and (h-2) mentioned above, we obtain the following formulae (j-1) and (j-2)

$$\nu_{eFC} = V_0 V_1/[(V_0-V_1)a+V_1] \tag{j-1}$$

$$\nu_{egF} = V_0(g) \cdot V_1(g)/[(V_0(g)-V_1(g))a+V_1(g)] \tag{j-2}$$

wherein the reference symbol a represents a ratio of refractive power of medium which is expressed by the following formula (k):

$$a = \phi_m/(\phi_s+\phi_m) \tag{k}$$

From the formulae (j-1) and (j-2) mentioned above, refractive powers of surface and medium of a radial type gradient index lens component are considered in the dispersion characteristics of the imaginary glass material.

For correcting chromatic aberration favorably at the three wavelengths of the d-line, C-line and F-line with a radial type gradient index lens component, it is desirable from the formula (j-1) to satisfy the following condition (4):

$$-1 < 1/\nu_{eFC} < 1 \tag{4}$$

When the condition (4) is satisfied, it is possible to correct chromatic aberration favorably at the three wavelengths of the d-line, C-line and F-line. If the lower limit of −1 of the condition (4) is exceeded, chromatic aberration will be overcorrected. If the upper limit of 1 of the condition (4) is exceeded, in contrast, chromatic aberration will be undercorrected.

For correcting chromatic aberration favorably at the three wavelengths of the d-line, F-line and g-line with a radial type gradient index lens component, it is desirable similarly from the formula (j-2) to satisfy the following condition (5):

$$-5 < 1/\nu_{egF} < 5 \tag{5}$$

When the condition (5) is satisfied, it is possible to correct chromatic aberration favorably at the three wavelengths of the d-line, F-line and g-line. If the lower limit of −5 of the condition (5) is exceeded, chromatic aberration will be overcorrected. If the upper limit of 5 of the condition (5) is exceeded, in contrast, chromatic aberration will be undercorrected.

When the conditions (4) and (5) are satisfied at the same time, it is possible to correct chromatic aberration at the four wavelengths of the d-line, C-line, F-line and g-line.

When it is required to correct chromatic aberration at wavelengths shorter than that of the g-line, it is sufficient to use, in place of the coefficient for the g-line, to use, in place of the coefficient of the g-line, a coefficient for a shortest wavelength at which chromatic aberration is to be corrected in the above-mentioned conditions specified by the present invention, thereby making it possible to correct chromatic aberration within a required wavelength region. Similar means can be adopted for correcting chromatic aberration at wavelengths longer than that of the C-line.

For correcting chromatic aberration at the four wavelengths of the d-line, C-line, F-line and g-line it is desirable to satisfy the condition (1) as described above. For correcting chromatic aberration more favorably, however, it is desirable to satisfy, in place of the condition (1), the following condition (1-1):

$$\Delta\theta_{gF} < 0.5 \quad (1\text{-}1)$$

For correcting chromatic aberration favorably at the three wavelengths of the d-line, C-line and F-line, it is desirable to satisfy the condition (2) as described above. However, it is more desirable to satisfy, in place of the condition (2), the following condition (2-1):

$$-0.15 < 1/V_1 < 0.06 \quad (2\text{-}1)$$

When a minuter image is demanded, it is desirable to satisfy, in place of the condition (2) or (2-1), the following condition (2-2):

$$-0.1 < 1/V_1 < 0.05 \quad (2\text{-}2)$$

For correcting chromatic aberration at the three wavelengths of the d-line, F-line and g-line, it is desirable to satisfy the condition (3) as described above. However, it is more desirable to satisfy, in place of the condition (3), to satisfy the following condition (3-1):

$$-0.5 < 1/V_1(g) < 0.5 \quad (3\text{-}1)$$

When a minuter image is demanded, it is desirable to satisfy, in place of the condition (3) or (3-1), the following condition (3-2):

$$-0.1 < 1/V_1(g) < 0.05 \quad (3\text{-}2)$$

It is more desirable to satisfy the condition (4-1) mentioned below in place of the condition (4) which is defined for correcting chromatic aberration of the d-line, C-line and F-line:

$$-0.5 < 1/\nu_{eFC} < 0.5 \quad (4\text{-}1)$$

When a minuter image is demanded, it is desirable to satisfy, in place of the condition (4) or (4-1), the following condition (4-2):

$$-0.1 < 1/\nu_{eFC} < 0.1 \quad (4\text{-}2)$$

For correcting chromatic aberration at the three wavelengths of the d-line, F-line and g-line, it is desirable to satisfy, in place of the condition (5), the following condition (5-1):

$$-1 < 1/\nu_{egF} < 1 \quad (5\text{-}1)$$

When a minuter image is demanded, it is desirable to satisfy, in place of the condition (5) or (5-1), the following condition (5-2):

$$-0.5 < 1/\nu_{egF} < 0.5 \quad (5\text{-}2)$$

When the optical system according to the present invention is to be applied to a lens system having a fixed focal point, it is first desirable to satisfy the condition (1) which is required for correcting chromatic aberration. When the optical system according to the present invention is to be used for correcting chromatic aberration with a radial type gradient index lens element in a zoom optical system which allows correction of chromatic aberration more hardly than an optical system having a fixed focal point, it is desirable to satisfy the conditions (1) and (2) or the conditions (2) and (3).

A radial type gradient index lens component can be used independently or in an optical system composed of a plurality of optical elements.

When a manufacturing cost is regarded as a matter of importance, it is desirable to use only one radial type gradient index lens component.

For favorably correcting chromatic aberration, it is desirable to satisfy, in place of the condition (1-1), the following condition (1-2):

$$\Delta\theta_{gF} < 0.2 \quad (1\text{-}2)$$

For correcting chromatic aberration, it is more desirable to satisfy, in place of the condition (5-2), the following condition (5-3):

$$-0.1 < 1/\nu_{egF} < 0.1 \quad (5\text{-}3)$$

The optical system according to the present invention is usable as an optical system for silver salt cameras, video cameras, digital camera, endoscopes, image pickup devices, microscopes, image transmitting optical systems, measuring apparatuses, TV telephones, information input appliances and so on.

Though variations of a refractive index of a medium of a gradient index material of a radial type gradient index lens element is approximated by the square formula (a), gradient index materials having refractive indices whose variations are expressed by formulae other than the formula (a) can also be used for the optical system according to the present invention when the variations are approximated by the formula (a).

Now, the preferred embodiment of the optical system according to the present invention will be described below:

Embodiment 1 focal length f = 200, F number = 2.8
$r_1 = \infty$ (stop)
  $d_1 = 1.0000$
$r_2 = -539.3855$
  $d_2 = 30.0000$   $n_1$ (gradient index lens element)
$r_3 = -435.1991$
  $d_3 = 196.1227$
$r_4 = \infty$ (image)
gradient index lens element

| wavelength | | $N_0$ | $N_1$ | $N_2$ |
|---|---|---|---|---|
| d line | 587.56, | 1.70000, | $-7.8900 \times 10^{-5}$, | $5.4463 \times 10^{-10}$ |
| C line | 656.27, | 1.69533, | $-7.8922 \times 10^{-5}$, | $5.4521 \times 10^{-10}$ |
| F line | 486.13, | 1.71089, | $-7.8845 \times 10^{-5}$, | $5.4647 \times 10^{-10}$ |
| g line | 435.84, | 1.71972, | $-7.8796 \times 10^{-5}$, | $5.4187 \times 10^{-10}$ |

$\Delta\theta_{gF} = 1.7 \times 10^{-4}$, $1/V_1 = -1.0 \times 10^{-3}$,
$1/V_1(g) -6.0 \times 10^{-4}$, $\nu_{eFC} = 5.0 \times 10^{-4}$,
$\nu_{egF} = 2.0 \times 10^{-4}$, effective diameter $D_e = 36.86$, $\Delta_{nd} = 0.106$, $\sum_{i=2}^{n} N_{id} D_e^{2i} = 1.0 \times 10^{-3}$

Embodiment 2 f = 200, F number = 5.6
$r_1 = \infty$ (stop)
$\quad d_1 = 30.0000 \qquad n_1$ (gradient index lens element)
$r_2 = \infty$
$\quad d_2 = 191.2873$
$r_3 = \infty$ (image)
gradient index lens element

| wavelength | $N_0$ | $N_1$ | $N_2$ |
|---|---|---|---|
| d line 587.56, | 1.70000, | $-8.4514 \times 10^{-5}$, | $6.5243 \times 10^{-10}$ |
| C line 656.27, | 1.69533, | $-8.4509 \times 10^{-5}$, | $6.5605 \times 10^{-10}$ |
| F line 486.13, | 1.71089, | $-8.4534 \times 10^{-5}$, | $6.5624 \times 10^{-10}$ |
| g line 435.84, | 1.71972, | $-8.4542 \times 10^{-5}$, | $6.4780 \times 10^{-10}$ |

$\Delta\theta_{gF} = 7.0 \times 10^{-5}$, $1/V_1 = 3.0 \times 10^{-4}$,
$1/V_1 (g) = 1.0 \times 10^{-4}$, $\nu_{eFC} = 3.0 \times 10^{-4}$,
$\nu_{egF} = 1.0 \times 10^{-4}$, effective diameter $D_e = 18.78$, $\Delta_{nd} = 0.03$, $\sum_{i=2}^{n} N_{id} D_e^{2i} = 8.1 \times 10^{-5}$

Embodiment 3 f = 200, F number = 3.5, $2\omega = 12.3°$
$r_1 = 92.1037$
$\quad d_1 = 23.8235 \qquad n_1$ (gradient index lens element)
$r_2 = 74.8597$ -continued $\quad d_2 = 5.1710$
$r_3 = 45.9880$
$\quad d_3 = 15.6257 \qquad n_2 = 1.83400 \qquad \nu_2 = 37.17$
$r_4 = 36.5604$
$\quad d_4 = 18.9259$
$r_5 = \infty$ (stop)
$\quad d_5 = 0.6255$
$r_6 = 218.9472$
$\quad d_6 = 7.4011 \qquad n_3 = 1.60342 \qquad \nu_3 = 38.01$
$r_7 = -725.0040$
$\quad d_7 = 124.6556$
$r_8 = \infty$ (image)
gradient index lens element

| wavelength | $N_0$ | $N_1$ | $N_2$ |
|---|---|---|---|
| d line 587.56, | 1.65000, | $-8.0403 \times 10^{-5}$, | $-1.5195 \times 10^{-9}$ |
| C line 656.27, | 1.64512, | $-8.0826 \times 10^{-5}$, | $-1.5479 \times 10^{-9}$ |
| F line 486.13, | 1.66138, | $-7.9385 \times 10^{-5}$, | $-1.4948 \times 10^{-9}$ |
| g line 435.84, | 1.67083, | $-7.8549 \times 10^{-5}$, | $-1.4037 \times 10^{-9}$ |

$\Delta\theta_{gF} = 4.3 \times 10^{-3}$, $1/V_1 = -1.7 \times 10^{-2}$,
$1/V_1 (g) = -1.0 \times 10^{-2}$, $\nu_{eFC} = -4.9 \times 10^{-2}$,
$\nu_{egF} = -2.8 \times 10^{-2}$, effective diameter $D_e = 33.56$, $\Delta_{nd} = 0.092$, $\sum_{i=2}^{n} N_{id} D_e^{2i} = -1.9 \times 10^{-3}$

Embodiment 4 f = 0.77, F number = 4.7, $2\omega = 113.3°$
object distance 9 mm
$r_1 = \infty$
$\quad d_1 = 0.3200 \qquad n_1 = 1.51633 \qquad \nu_1 = 64.15$
$r_2 = 0.4025$
$\quad d_2 = 0.2229$
$r_3 = \infty$
$\quad d_3 = 0.6556 \qquad n_2 = 1.84666 \qquad \nu_2 = 23.78$
$r_4 = -0.9538$
$\quad d_4 = 0.1230$
$r_5 = \infty$ (stop)
$\quad d_5 = 0.6316$
$r_6 = 2.1852$
$\quad d_6 = 0.8955 \qquad n_3$ (gradient index lens element)
$r_7 = -3.2816$
$\quad d_7 = 0.3800$
$r_8 = \infty$
$\quad d_8 = 0.7500 \qquad n_4 = 1.53172 \qquad \nu_4 = 48.91$
$r_9 = \infty$
$\quad d_9 = 0.0048$
$r_{10} = \infty$ (image)
gradient index lens element

| wavelength | $N_0$ | $N_1$ | $N_2$ | $N_3$ |
|---|---|---|---|---|
| d line 581.56, | 1.65000, | $-1.5405 \times 10^{-1}$, | $1.5784 \times 10^{-1}$, | $2.9179 \times 10^{-2}$ |
| C line 656.27, | 1.64512, | $-1.5400 \times 10^{-1}$, | $1.5784 \times 10^{-1}$, | $2.9179 \times 10^{-2}$ |
| F line 486.13, | 1.66138, | $-1.5418 \times 10^{-1}$, | $1.5784 \times 10^{-1}$, | $2.9179 \times 10^{-2}$ |
| g line 435.84, | 1.67088, | $-1.5430 \times 10^{-1}$, | $1.5784 \times 10^{-1}$, | $2.9179 \times 10^{-2}$ |

$\Delta\theta_{gF} = 4.0 \times 10^{-4}$, $1/V_1 = 1.2 \times 10^{-3}$,
$1/V_1 (g) = 8.0 \times 10^{-4}$, $\nu_{eFC} = 1.7 \times 10^{-2}$,
$\nu_{egF} = 9.6 \times 10^{-3}$, $1/\nu_p = 4.2 \times 10^{-2}$,
effective diameter $D_e = 0.66$, $\Delta_{nd} = 0.035$, $\sum_{i=2}^{n} N_{id} D_e^{2i} = 3.2 \times 10^{-2}$

Embodiment 5 f = 0.59, F number = 3.4, 2ω = 113.2°
object distance 9 mm
$r_1 = \infty$
  $d_1 = 0.3200$    $n_1 = 1.48749$    $\nu_1 = 70.21$
$r_2 = 0.7618$
  $d_2 = 9.3792$
$r_3 = \infty$ (stop)
  $d_3 = 0.0300$
$r_4 = \infty$
  $d_4 = 0.8916$    $n_2$ (gradient index lens element)
$r_5 = -0.6460$
  $d_5 = 0.3569$
$r_6 = \infty$
  $d_6 = 0.7600$    $n_3 = 1.51633$    $\nu_3 = 64.15$
$r_7 = \infty$
  $d_7 = 0.0075$
$r_8 = \infty$ (image)
gradient index lens element

| | wavelength | $N_0$ | $N_1$ | $N_2$ | $N_3$ |
|---|---|---|---|---|---|
| d line | 587.56, | 1.69680, | $-3.5000 \times 10^{-1}$, | $3.5660 \times 10^{-1}$, | 1.4540 |
| C line | 656.27, | 1.69297, | $-3.5583 \times 10^{-1}$, | $3.6254 \times 10^{-1}$, | 1.4782 |
| F line | 486.13, | 1.70552, | $-3.3639 \times 10^{-1}$, | $3.4273 \times 10^{-1}$, | 1.3975 |
| g line | 435.84, | 1.71234, | $-3.4033 \times 10^{-1}$, | $7.9916 \times 10^{-1}$, | $-1.3650$ |

$\Delta\theta_{gF} = 1.8 \times 10^{-1}$, $1/V_1 = -5.6 \times 10^{-2}$,
$1/V_1(g) = 1.1 \times 10^{-2}$, $\nu_{eFC} = -8.9 \times 10^{-3}$,
$\nu_{egF} = 1.0 \times 10^{-2}$, effective diameter $D_e = 0.42$, $\Delta_{nd} = 0.042$, $\sum_{i=2}^{n} N_{id} D_e^{2i} = 1.9 \times 10^{-2}$

Embodiment 6 magnification = 1, NA = 0.073, image height = 0.98,
object distance 4.9 mm
$r_1 = 10.2360$
  $d_1 = 21.3300$    $n_1 = 1.62004$    $\nu_1 = 36.26$
$r_2 = \infty$
  $d_2 = 3.2080$    $n_2$ (gradient index lens element)
$r_3 = \infty$
  $d_3 = 1.6240$
$r_4 = \infty$
  $d_4 = 3.2080$    $n_3$ (gradient index lens element)
$r_5 = \infty$
  $d_5 = 21.3300$    $n_4 = 1.62004$    $\nu_4 = 36.26$
$r_6 = -10.2360$
  $d_6 = 4.8999$
$r_7 = \infty$ (image)
gradient index lens element

| | wavelength | $N_0$ | $N_1$ |
|---|---|---|---|
| d line | 587.56, | 1.66400, | $-7.5000 \times 10^{-3}$ |
| C line | 656.27, | 1.65879, | $-7.4966 \times 10^{-3}$ |
| F line | 486.13, | 1.67617, | $-7.5080 \times 10^{-3}$ |
| g line | 435.84, | 1.68636, | $-7.4906 \times 10^{-3}$ |

$\Delta\theta_{gF} = 1.5 \times 10^{-3}$, $1/V_1 = 1.5 \times 10^{-3}$,
$1/V_1(g) = -2.3 \times 10^{-3}$, $\nu_{eFC} = 1.5 \times 10^{-3}$,
$\nu_{egF} = -2.3 \times 10^{-3}$, effective diameter $D_e = 1.32$, $\Delta_{nd} = 0.013$, $\sum_{i=2}^{n} N_{id} D_e^{2i} = 0$

Embodiment 7 f = 4.83 ~ 8.29 ~ 14.38, F number = 2.8 ~ 3.0 ~ 3.9
2ω = 70.20° ~ 42.5° ~ 24.8°
$r_1 = 26.2532$
  $d_1 = 2.6000$    $n_1 = 1.77250$    $\nu_1 = 49.60$
$r_2 = 76.0387$
  $d_2 = D_1$ (variable)
$r_3 = 10.9651$
  $d_3 = 1.0000$    $n_2 = 1.84666$    $\nu_2 = 23.78$
$r_4 = 5.1833$
  $d_4 = 4.2692$
$r_5 = -18.5991$
  $d_5$ 1.0000    $n_3 = 1.48749$    $\nu_3 = 70.21$
$r_6 = 6.0022$
  $d_6 = 2.4000$    $n_4 = 1.84666$    $\nu_4 = 23.78$
$r_7 = 13.6560$
  $d_7 = D_2$ (variable)
$r_8 = \infty$ (stop)
  $d_8 = D_3$ (variable)
$r_9 = 23.3185$
  $d_9 = 15.9260$    $n_5$ (gradient index lens element)
$r_{10} = -20.2536$
  $d_{10} = D_4$ (variable)
$r_{11} = \infty$
  $d_{11} = 4.2200$    $n_6 = 1.61700$    $\nu_6 = 62.80$
$r_{12} = \infty$
  $d_{12} = 1.0000$
$r_{13} = \infty$
  $d_{13} = 0.8000$    $n_7 = 1.51633$    $\nu_7 = 64.15$
$r_{14} = \infty$
  $d_{14} = 1.1931$
$r_{15} = \infty$ (image)

| f | 4.83 | 8.29 | 14.38 |
|---|---|---|---|
| $D_1$ | 1.00000 | 7.38243 | 10.82331 |
| $D_2$ | 11.82334 | 5.44086 | 2.0000 |
| $D_3$ | 6.39368 | 4.48772 | 1.00000 |
| $D_4$ | 4.93186 | 6.83784 | 10.32555 | gradient index lens element

| | wavelength | $N_0$ | $N_1$ | $N_2$ |
|---|---|---|---|---|
| d line | 587.56, | 1.75000, | $-1.5595 \times 10^{-3}$, | $3.3947 \times 10^{-6}$ |
| C line | 656.27, | 1.74550, | $-1.5698 \times 10^{-3}$, | $3.3930 \times 10^{-6}$ |
| F line | 486.13, | 1.76050, | $-1.5356 \times 10^{-3}$, | $3.3963 \times 10^{-6}$ |
| g line | 435.84, | 1.76876, | $-1.5112 \times 10^{-3}$, | $3.1693 \times 10^{-6}$ |

$\Delta\theta_{gF} = 1.8 \times 10^{-3}$, $1/V_1 = -2.2 \times 10^{-2}$,

-continued $1/V_1$ (g) = $-1.6 \times 10^{-2}$, $\nu_{eFC}$ = $2.5 \times 10^{-3}$,
$\nu_{egF}$ = $-1.0 \times 10^{-4}$, effective diameter $D_e$ = 4.73, $\Delta_{nd}$ = 0.033, $\sum_{i=2}^{n} N_{id}D_e^{2i}$ = $1.7 \times 10^{-3}$

Embodiment 8 f = 0.65, F number = 4.25, $2\omega$ = 113°
object distance 9 mm
$r_1 = \infty$
    $d_1$ = 0.3200    $n_1$ = 1.51633    $\nu_1$ = 64.15
$r_2$ = 0.4397
    $d_2$ = 0.1672
$r_3 = \infty$
    $d_3$ = 0.7894    $n_2$ (gradient index lens element)
$r_4 = \infty$ (stop)
    $d_4$ = 0.2910
$r_5$ = 2.1800
    $d_5$ = 0.5912    $n_3$ = 1.88300    $\nu_3$ = 40.78
$r_6$ = $-1.2158$
    $d_6$ = 0.3800
$r_7 = \infty$
    $d_7$ = 0.7500    $n_4$ = 1.53172    $\nu_4$ = 48.91
$r_8 = \infty$
    $d_8$ = 0.0060
$r_9 = \infty$ (image)
gradient index lens element

| wavelength | | $N_0$ | $N_1$ | $N_2$ | $N_3$ |
|---|---|---|---|---|---|
| d line | 587.56, | 1.65200, | $-5.4253 \times 10^{-1}$, | $6.6408 \times 10^{-1}$, | 1.0097 |
| C line | 656.27, | 1.64616, | $-5.3145 \times 10^{-1}$, | $6.5052 \times 10^{-1}$, | $9.8907 \times 10^{-1}$ |
| F line | 486.13, | 1.66562, | $-5.6836 \times 10^{-1}$, | $6.9570 \times 10^{-1}$, | 1.0578 |
| g line | 435.84, | 1.67733, | $-5.9247 \times 10^{-1}$, | $7.2632 \times 10^{-1}$, | 1.1002 |

$\Delta\theta_{gF}$ = $1.1 \times 10^{-2}$, $1/V_1$ = $6.8 \times 10^{-2}$,
$1/V_1$ (g) = $4.4 \times 10^{-2}$, $\nu_{eFC}$ = $6.8 \times 10^{-2}$,
$\nu_{egF}$ = $4.4 \times 10^{-2}$, effective diameter $D_e$ = 0.33, $\Delta_{nd}$ = 0.05, $\sum_{i=2}^{n} N_{id}D_e^{2i}$ = $2.7 \times 10^{-3}$

Embodiment 9 f = 2.74, F number = 2.8, $2\omega$ = 68.1°
$r_1$ = 3.0226
    $d_1$ = 1.7507    $n_1$ (gradient index lens element)
$r_2$ = 1.4700
    $d_2$ = 1.6154
$r_3 = \infty$ (stop)
    $d_3$ = 1.1572
$r_4$ = 3.7806
    $d_4$ = 2.4588    $n_2$ = 1.69680    $\nu_2$ = 55.53
$r_5$ = $-2.2830$ (aspherical surface)
    $d_5$ = 0.7143
$r_6 = \infty$
    $d_6$ = 0.7500    $n_3$ = 1.48749    $\nu_3$ = 70.21
$r_7 = \infty$
    $d_7$ = 1.1839
$r_8 = \infty$ (image)

aspherical surface coefficients

K = 0, $A_4$ = $3.1652 \times 10^{-2}$, $A_6$ = $5.4023 \times 10^{-5}$,
$A_8$ = $5.2354 \times 10^{-4}$
gradient index lens element

| wavelength | | $N_0$ | $N_1$ | $N_2$ |
|---|---|---|---|---|
| d line | 587.56, | 1.60000, | $-8.0063 \times 10^{-3}$, | $-2.4555 \times 10^{-3}$ |
| C line | 656.27, | 1.59400, | $-7.7381 \times 10^{-3}$, | $-2.3621 \times 10^{-3}$ |
| F line | 486.13, | 1.61400, | $-8.5860 \times 10^{-3}$, | $-2.6962 \times 10^{-3}$ |
| g line | 435.84, | 1.62646, | $-8.8951 \times 10^{-3}$, | $-2.9391 \times 10^{-3}$ |

$\Delta\theta_{gF}$ = $2.9 \times 10^{-2}$, $1/V_1$ = $1.1 \times 10^{-1}$,
$1/V_1$ (g) = $3.9 \times 10^{-2}$, $\nu_{eFC}$ = $2.2 \times 10^{-2}$,
$\nu_{egF}$ = $1.8 \times 10^{-2}$, effective diameter $D_e$ = 2.22, $\Delta_{nd}$ = 0.99, $\sum_{i=2}^{n} N_{id}D_e^{2i}$ = $-6.0 \times 10^{-2}$

Embodiment 10 f = 3.5, F number = 2.8, $2\omega$ = 53.5°
$r_1 = \infty$
    $d_1$ = 0.9995    $n_1$ (gradient index lens element)
$r_2 = \infty$
    $d_2$ = 2.4180
$r_3 = \infty$ (stop)
    $d_3$ = 1.9120
$r_4$ = 5.7262 (aspherical surface)
    $d_4$ = 2.1687    $n_2$ 1.49241    $\nu_2$ = 57.66
$r_5$ = $-2.0588$ (aspherical surface)
    $d_5$ = 1.1430
$r_6 = \infty$
    $d_6$ = 0.7500    $n_3$ = 1.48749    $\nu_3$ = 70.21
$r_7 = \infty$
    $d_7$ = 1.1699
$r_8 = \infty$ (image)

aspherical surface coefficients (4th surface)    K = 0, $A_4$ = $-4.0591 \times 10^{-2}$,
    $A_6$ = $1.7649 \times 10^{-2}$, $A_8$ = $-2.9442 \times 10^{-3}$
(5th surface)    K = 0, $A_4$ = $1.2889 \times 10^{-2}$, -continued $A_6 = -3.2348 \times 10^{-3}, A_8 = 2.0091 \times 10^{-3}$ gradient index lens element

| wavelength | | $N_0$ | $N_1$ | $N_2$ |
|---|---|---|---|---|
| d line | 587.56, | 1.60000, | $-6.1989 \times 10^{-3}$, | $-1.0393 \times 10^{-3}$ |
| C line | 656.27, | 1.59400, | $-5.9922 \times 10^{-3}$, | $-1.0046 \times 10^{-3}$ |
| F line | 486.13, | 1.61400, | $-6.6810 \times 10^{-3}$, | $-1.1201 \times 10^{-3}$ |
| g line | 435.84, | 1.62646, | $-7.1807 \times 10^{-3}$, | $-1.2024 \times 10^{-3}$ |

$\Delta\theta_{gF} = 2.6 \times 10^{-2}, 1/V_1 = 1.1 \times 10^{-1},$
$1/\overline{V}_1 (g) = 8.1 \times 10^{-2}, \nu_{eFC} = 1.1 \times 10^{-1},$
$\nu_{egF} = 8.1 \times 10^{-2},$ effective diameter $D_e = 1.98,$ $\Delta_{nd} = 0.04, \sum_{i=2}^{n} N_{id}D_e^{2i} = -1.6 \times 10^{-2}$ Embodiment 11

$f = 0.96,$ F number $= 4.25, 2\omega = 112.9°,$
object distance 9 mm
$r_1 = \infty$
     $d_1 = 0.3000$      $n_1 = 1.51633$      $\nu_1 = 64.15$
$r_2 = \infty$
     $d_2 = 0.1500$
$r_3 = -1.7433$
     $d_3 = 2.3691$      $n_2$ (gradient index lens element)
$r_4 = -0.9326$
     $d_4 = 0.3800$
$r_5 = \infty$
     $d_5 = 0.7500$      $n_3 = 1.53172$      $\nu_3 = 48.91$
$r_6 = \infty$
     $d_6 = 0.0023$
$r_7 = \infty$ (image)

gradient index lens element

| wavelength | | $N_0$ | $N_1$ | $N_2$ | $N_3$ |
|---|---|---|---|---|---|
| d line | 587.56, | 1.57000, | $-1.8143 \times 10^{-1}$, | $9.8792 \times 10^{-2}$, | $-1.8066 \times 10^{-1}$ |
| C line | 656.27, | 1.56715, | $-1.7983 \times 10^{-1}$, | $9.7920 \times 10^{-2}$, | $-1.7907 \times 10^{-1}$ |
| F line | 486.13, | 1.57665, | $-1.8517 \times 10^{-1}$, | $1.0083 \times 10^{-1}$, | $-1.8438 \times 10^{-1}$ |
| g line | 435.84, | 1.58176, | $-1.8795 \times 10^{-1}$, | $1.0115 \times 10^{-1}$, | $-1.8621 \times 10^{-1}$ |

$\Delta\theta_{gF} = 1.0 \times 10^{-2}, 1/V_1 = 2.9 \times 10^{-2},$
$1/\overline{V}_1 (g) = 1.5 \times 10^{-2}, \nu_{eFC} = 2.6 \times 10^{-2},$
$\nu_{egF} = 1.4 \times 10^{-2},$ effective diameter $D_e = 0.65,$ $\Delta_{nd} = 0.06, \sum_{i=2}^{n} N_{id}D_e^{2i} = 4.0 \times 10^{-3}$ Embodiment 12 magnification $= 10,$ NA $= 0.25,$ working distance WD $= 11.5,$
image height IH $= 11$ mm
$r_1 = \infty$ (stop)
     $d_1 = 11.5000$
$r_2 = \infty$
     $d_2 = 26.7629$      $n_1$ (gradient index lens element 1)
$r_3 = 31.5066$
     $d_3 = 2.7789$
$r_4 = 17.9547$
     $d_4 = 7.1016$      $n_2$ (gradient index lens element 2)
$r_5 = 13.6359$ gradient index lens element 1

| wavelength | | $N_0$ | $N_1$ | $N_2$ | $N_{34}$ |
|---|---|---|---|---|---|
| d line | 587.56, | 1.65000, | $-1.5739 \times 10^{-3}$, | $4.9004 \times 10^{-6}$, | $-6.6825 \times 10^{-9}$ |

|  | wavelength | $N_0$ | $N_1$ | $N_2$ | $N_3$ |
|---|---|---|---|---|---|
| C line | 656.27, | 1.64512, | $-1.5542 \times 10^{-3}$, | $4.9004 \times 10^{-6}$, | $-6.6825 \times 10^{-9}$ |
| F line | 486.13, | 1.66138, | $-1.6200 \times 10^{-3}$, | $4.9004 \times 10^{-6}$, | $-6.6825 \times 10^{-9}$ |
| g line | 435.84, | 1.67083, | $-1.6604 \times 10^{-3}$, | $4.9004 \times 10^{-6}$, | $-6.6825 \times 10^{-9}$ |

$\Delta\theta_{gF} = 6.0 \times 10^{-4}$, $1/V_1 = -4.1 \times 10^{-3}$,
$1/\bar{V}_1 (g) = -2.9 \times 10^{-3}$, $\nu_{eFC} = -1.8 \times 10^{-2}$,
$\nu_{egF} = -1.1 \times 10^{-2}$, effective diameter $D_e = 4.9$, $\Delta_{nd} = 0.028$, $\sum_{i=2}^{n} N_{id} D_e^{2i} = -1.0 \times 10^{-4}$ gradient index lens element 2

|  | wavelength | $N_0$ | $N_1$ | $N_2$ | $N_3$ |
|---|---|---|---|---|---|
| d line | 587.56, | 1.65000, | $-1.1724 \times 10^{-3}$, | $-2.5995 \times 10^{-7}$, | $3.5117 \times 10^{-9}$ |
| C line | 656.27, | 1.64512, | $-1.1736 \times 10^{-3}$, | $-2.5985 \times 10^{-7}$, | $3.5187 \times 10^{-9}$ |
| F line | 486.13, | 1.66138, | $-1.1688 \times 10^{-3}$, | $-2.6014 \times 10^{-7}$, | $3.4926 \times 10^{-9}$ |
| g line | 435.84, | 1.67083, | $-1.1654 \times 10^{-3}$, | $-2.6050 \times 10^{-7}$, | $3.4704 \times 10^{-9}$ |

$\Delta\theta_{gF} = 2.5 \times 10^{-3}$, $1/V_1 = 4.2 \times 10^{-2}$,
$1/\bar{V}_1 (g) = 2.6 \times 10^{-2}$, $\nu_{eFC} = 6.0 \times 10^{-2}$,
$\nu_{egF} = 3.7 \times 10^{-2}$, effective diameter $D_e = 5.1$, $\Delta_{nd} = 0.038$, $\sum_{i=2}^{n} N_{id} D_e^{2i} = 3.2 \times 10^{-3}$

Embodiment 13 magnification 20, NA = 0.4, working distance WD = 2.92,
image height IH = 11 mm
$r_1 = \infty$ (stop)
  $d_1 = 2.9234$
$r_2 = -7.0050$
  $d_2 = 14.0168$  $n_1$ (gradient index lens element 1)
$r_3 = -21.7010$
  $d_3 = 21.7533$
$r_4 = 38.5480$
  $d_4 = 4.5512$  $n_2$ (gradient index lens element 2)
$r_5 = 17.2541$
gradient index lens element 1

|  | wavelength | $N_0$ | $N_1$ | $N_2$ |
|---|---|---|---|---|
| d line | 587.56, | 1.65000, | $-4.8005 \times 10^{-3}$, | $-3.4095 \times 10^{-6}$ |
| C line | 656.27, | 1.64512, | $-4.7988 \times 10^{-3}$, | $-3.4509 \times 10^{-6}$ |
| F line | 486.13, | 1.66138, | $-4.8026 \times 10^{-3}$, | $-3.4578 \times 10^{-6}$ |
| g line | 435.84, | 1.67083, | $-4.8021 \times 10^{-3}$, | $-3.5223 \times 10^{-6}$ |

$\Delta\theta_{gF} = 1.9 \times 10^{-3}$, $1/V_1 = 8.0 \times 10^{-4}$,
$1/\bar{V}_1 (g) = -1.0 \times 10^{-4}$, $\nu_{eFC} = -2.0 \times 10^{-2}$,
$\nu_{egF} = -1.3 \times 10^{-2}$, effective diameter $D_e = 4.7$, $\Delta_{nd} = 0.089$, $\sum_{i=2}^{n} N_{id} D_e^{2i} = -1.1 \times 10^{-3}$ gradient index lens 2

|  | wavelength | $N_0$ | $N_1$ | $N_2$ |
|---|---|---|---|---|
| d line | 587.56, | 1.65000, | $-1.6941 \times 10^{-3}$, | $7.0683 \times 10^{-6}$ |
| C line | 656.27, | 1.64512, | $-1.6794 \times 10^{-3}$, | $7.1329 \times 10^{-6}$ |
| F line | 486.13, | 1.66138, | $-1.7326 \times 10^{-3}$, | $7.2042 \times 10^{-6}$ |
| g line | 435.84, | 1.67083, | $-1.7696 \times 10^{-3}$, | $7.3600 \times 10^{-6}$ |

$\Delta\theta_{gF} = 4.4 \times 10^{-3}$, $1/V_1 = 3.1 \times 10^{-2}$,
$1/\bar{V}_1 (g) = 2.2 \times 10^{-2}$, $\nu_{eFC} = 6.7 \times 10^{-3}$,
$\nu_{egF} = -6.4 \times 10^{-3}$, effective diameter $D_e = 3.99$, $\Delta_{nd} = 0.025$, $\sum_{i=2}^{n} N_{id} D_e^{2i} = 1.8 \times 10^{-3}$

Embodiment 14 magnification = 40, NA = 0.64, working distance WD = 0.61,
image height IH = 11 mm
$r_1 = -3.2794$
  $d_1 = 2.4788$  $n_1 = 1.49700$  $\nu_1 = 81.61$
$r_2 = -2.1531$
  $d_2 = 0.0500$
$r_3 = -6.8320$
  $d_3 = 18.1895$  $n_2$ (gradient index lens element)
$r_4 = -14.6361$
  $d_4 = 13.3407$
$r_5 = 12.8668$
  $d_5 = 12.1630$  $n_3 = 1.88300$  $\nu_3 = 40.78$
$r_6 = 6.2581$
gradient index lens element

|  | wavelength | $N_0$ | $N_1$ | $N_2$ | $N_3$ |
|---|---|---|---|---|---|
| d line | 587.56, | 1.65000, | $-1.7589 \times 10^{-3}$, | $-2.7403 \times 10^{-6}$, | $-5.6429 \times 10^{-9}$ |
| C line | 656.27, | 1.64512, | $-1.7725 \times 10^{-3}$, | $-2.7968 \times 10^{-6}$, | $-5.7091 \times 10^{-9}$ |
| F line | 486.13, | 1.66138, | $-1.7270 \times 10^{-3}$, | $-2.6173 \times 10^{-6}$, | $-5.4950 \times 10^{-9}$ |

-continued

| | | | | |
|---|---|---|---|---|
| g line | 435.84, | 1.67083, | $-1.7011 \times 10^{-3}$, | $-2.5096 \times 10^{-6}$, | $-4.6903 \times 10^{-9}$ |

$\Delta\theta_{gF} = 5.0 \times 10^{-4}$, $1/V_{1} = -2.6 \times 10^{-2}$,
$1/V_1 (g) = -1.5 \times 10^{-2}$, $\nu_{eFC} = -2.2 \times 10^{-1}$,
$\nu_{egF} = -1.3 \times 10^{-1}$, effective diameter $D_e = 6.06$, $\Delta_{nd} 0.069$, $\sum_{i=2}^{n} N_{id}D_e^{2i} = -4.0 \times 10^{-3}$ Embodiment 15 magnification = 4, NA = 0.11, working distance WD = 26,
image height IH = 11 mm
$r_1 = \infty$
  $d_1 = 0.1700$   $n_1 = 1.52100$   $\nu_1 = 56.02$
$r_2 = \infty$
  $d_2 = 26.0000$
$r_3 = 132.5540$
  $d_3 = 6.7259$   $n_2$ (gradient index lens element)
$r_4 = 22.4861$
  $d_4 = 5.3177$
$r_5 = -62.2104$
  $d_5 = 7.2321$   $n_3 = 1.43875$   $\nu_3 = 94.97$
$r_6 = -12.0698$
gradient index lens element

| | wavelength | $N_0$ | $N_1$ | $N_2$ | $N_3$ |
|---|---|---|---|---|---|
| d line | 587.56, | 1.65000, | $-9.6284 \times 10^{-4}$, | $1.1792 \times 10^{-5}$, | $5.7019 \times 10^{-9}$ |
| C line | 656.27, | 1.64512, | $-9.6436 \times 10^{-4}$, | $1.1804 \times 10^{-5}$, | $5.7076 \times 10^{-9}$ |
| F line | 486.13, | 1.66138, | $-9.5930 \times 10^{-4}$, | $1.1764 \times 10^{-5}$, | $5.6886 \times 10^{-9}$ |
| g line | 435.84, | 1.67083, | $-9.5292 \times 10^{-4}$, | $1.1708 \times 10^{-5}$, | $5.6043 \times 10^{-9}$ |

$\Delta\theta_{gF} = 4.7 \times 10^{-3}$, $1/V_1 = -5.3 \times 10^{-3}$,
$1/V_1 (g) = -6.6 \times 10^{-3}$, $\nu_{eFC} = -6.1 \times 10^{-2}$,
$\nu_{egF} = 3.9 \times 10^{-2}$, effective diameter $D_e = 5.51$,
$\Delta_{nd} = 0.018$, $\Sigma N_{id}D_e^{2i} = 1.1 \times 10^{-2}$ Embodiment 16 f = 4.8, F number = 2.8, $2\omega = 46.4$
$r_1 = 6.9451$ (aspherical surface)
  $d_1 = 3.0000$   $n_1 = 1.52542$   $\nu_1 = 55.78$
$r_2 = \infty$ (reflecting surface)
  $d_2 = 2.5026$   $n_2 = 1.52542$   $\nu_2 = 55.78$
$r_3 = \infty$ (stop)
  $d_3 = 0.1000$
$r_4 = \infty$
  $d_4 = 17.5594$   $n_3$ (gradient index lens element)
$r_5 = \infty$
  $d_5 = 0.7500$   $n_4 = 1.48749$   $\nu_4 = 70.21$
$r_6 = \infty$
  $d_6 = 1.1898$
$r_7 = \infty$ (image)

aspherical surface coefficients $K = -1.5748$,   $A_4 = 1.5864 \times 10^{-3}$,   $A_6 = 1.3706 \times 10^{-5}$
  $A_8 = -1.9519 \times 10^{-4}$,   $A_{10} = 3.3178 \times 10^{-5}$
gradient index lens element -continued

| | wavelength | $N_0$ | $N_1$ |
|---|---|---|---|
| d line | 587.56, | 1.66400, | $-7.5000 \times 10^{-3}$ |
| C line | 656.27, | 1.65879, | $-7.4966 \times 10^{-3}$ |
| F line | 486.13, | 1.67617, | $-7.5080 \times 10^{-3}$ |
| g line | 435.84, | 1.68636, | $-7.4906 \times 10^{-3}$ |

$\Delta\theta_{gF} = 6.3 \times 10^{-3}$, $1/V_1 = 1.5 \times 10^{-3}$,
$1/V_1 (g) = -2.3 \times 10^{-3}$, $\nu_{eFC} = 1.5 \times 10^{-3}$,
$\nu_{egF} = -2.3 \times 10^{-3}$, effective diameter $D_e = 2.14$, $\Delta_{nd} = 0.034$, $\sum_{i=2}^{n} N_{id}D_e^{2i} = 0$

Embodiment 17

$f = 3.1$, F number = 2.8, $2\omega = 65.4°$
$r_1 = \infty$ (stop)
  $d_1 = 0.1000$
$r_2 = \infty$
  $d_2 = 4.6740$    $n_1$ (gradient index lens element)
$r_3 = -3.7203$
  $d_3 = 1.9817$
$r_4 = 7000.0000$ (DOE)
  $d_4 = 0.0010$    $n_2 = 1.0 \times 10^3$    $\nu_2 = -3.45$
$r_5 = \infty$
  $d_5 = 0.5000$    $n_3 = 1.45851$    $\nu_3 = 66.75$
$r_6 = \infty$
  $d_6 = 0.7500$    $n_4 = 1.53172$    $\nu_4 = 48.91$
$r_7 = \infty$
  $d_7 = 0.0032$
$r_8 = \infty$ (image)

aspherical surface terms of diffractive optical element (4th surface)   $K = 0$, $A_4 = -2.1097 \times 10^{-5}$,
  $A_6 = 5.0147 \times 10^{-6}$, $A_8 = -3.0443 \times 10^{-7}$,
  $A_{10} = -1.3365 \times 10^{-8}$ gradient index lens element

| wavelength | | $N_0$ | $N_1$ | $N_2$ | $N_3$ |
|---|---|---|---|---|---|
| d line | 587.56, | 1.70000, | $-1.4314 \times 10^{-2}$, | $-7.4587 \times 10^{-4}$, | $3.4977 \times 10^{-4}$ |
| C line | 656.27, | 1.69580, | $-1.4176 \times 10^{-2}$, | $-7.4587 \times 10^{-4}$, | $3.4977 \times 10^{-4}$ |
| F line | 486.13, | 1.70980, | $-1.4636 \times 10^{-2}$, | $-7.4587 \times 10^{-4}$, | $3.4977 \times 10^{-4}$ |
| g line | 435.84, | 1.71757, | $-1.4899 \times 10^{-2}$, | $-7.4587 \times 10^{-4}$, | $3.4977 \times 10^{-4}$ |

$\Delta\theta_{gF} = 3.0 \times 10^{-3}$, $1/V_{1-3.2 \times 10^{-2}}$,
$1/\overline{V}_1$ (g) = $1.8 \times 10^{-2}$, $\nu_{eFC} = 2.5 \times 10^{-2}$,
$\nu_{egF} = 1.4 \times 10^{-2}$, effective diameter $D_e = 1.86$, $\Delta_{nd} = 0.044$, $\sum_{i=2}^{n} N_{id} D_e^{2i} = 5.6 \times 10^{-3}$

Embodiment 18

$f = 3.4$, F number = 2.5, $2\omega = 59.8°$
$r_1 = 2.7792$
  $d_1 = 1.9911$    $n_1$ (gradient index lens element)
$r_2 = 2.0705$
  $d_2 = 1.8771$
$r_3 = \infty$ (stop)
  $d_3 = 1.1110$
$r_4 = 13.5558$
  $d_4 = 2.8020$    $n_2 = 1.79952$    $\nu_2 = 42.24$
$r_5 = -2.3302$ (aspherical surface)
  $d_5 = 0.9255$
$r_6 = \infty$
  $d_6 = 0.7500$    $n_3 = 1.48749$    $\nu_3 = 70.21$
$r_7 = \infty$
  $d_7 = 1.1676$
$r_8 = \infty$ (image)

aspherical surface coefficients $K = 0$,   $A_4 = 1.6094 \times 10^{-2}$, $A_6 = -1.4276 \times 10^{-3}$,
  $A_8 = 6.3419 \times 10^{-4}$ gradient index lens element

| wavelength | | $N_0$ | $N_1$ | $N_2$ |
|---|---|---|---|---|
| d line | 587.56, | 1.50000, | $2.9522 \times 10^{-3}$, | $8.9433 \times 10^{-4}$ |
| C line | 656.27, | 1.49400, | $3.0407 \times 10^{-3}$, | $9.2116 \times 10^{-4}$ |
| F line | 486.13, | 1.51400, | $2.7455 \times 10^{-3}$, | $8.3172 \times 10^{-4}$ |
| g line | 435.84, | 1.52756, | $2.4308 \times 10^{-3}$, | $7.4093 \times 10^{-4}$ |

$\Delta\theta_{gF} = 1.3 \times 10^{-1}$, $1/V_1 = -1.0 \times 10^{-1}$,
$1/\overline{V}_1$ (g) = $-1.1 \times 10^{-1}$, $\nu_{eFC} = 1.8 \times 10^{-2}$,
$\nu_{egF} = 5.7 \times 10^{-3}$, effective diameter $D_e = 2.48$, $\Delta_{nd} = 0.052$, $\sum_{i=2}^{n} N_{id} D_e^{2i} = 3.4 \times 10^{-2}$

Embodiment 19

$f = 3.4$, F number = 2.8, $2\omega = 60.4°$
$r_1 = 3.9329$
  $d_1 = 2.1359$    $n_1 = 1.58423$    $\nu_1 = 30.49$
$r_2 = 1.9115$
  $d_2 = 0$    $n_2 = 1.0 \times 10^3$    $\nu_2 = -3.45$
$r_3 = 1.9114$ (DOE)
  $d_3 = 1.5050$
$r_4 = \infty$ (stop)
  $d_4 = 1.3716$
$r_5 = 4.6967$
  $d_5 = 3.3378$    $n_3 = 1.69680$    $\nu_3 = 55.53$
$r_6 = -2.9928$ (aspherical surface)
  $d_6 = 1.8296$
$r_7 = \infty$
  $d_7 = 0.7500$    $n_4 = 1.48749$    $\nu_4 = 70.21$
$r_8 = \infty$
  $d_8 = 1.2084$
$r_9 = \infty$ (image)

aspherical surface terms of diffractive optical element
(3rd surface)   $K = 0$, $A_4 = 9.1010 \times 10^{-6}$,
  $A_6 = -6.4422 \times 10^{-6}$ aspherical surface coefficients
$K = 0$,   $A_4 = 1.1402 \times 10^{-2}$, $A_6 = -9.8667 \times 10^{-5}$,
  $A_8 = 1.5019 \times 10^{-4}$ wherein the reference symbols $r_1, r_2, \ldots$ represent radii of curvature on surfaces of respective lens components, the reference symbols $d_1, d_2, \ldots$ designate thicknesses of the respective lens components and air-spaces reserved therebetween, the reference symbols $n_1, n_2, \ldots$ denote refractive indices of the respective lens components, and the reference symbols $v_1, v_2, \ldots$ represent Abbe's numbers of the respective lens components.

Figure 1:
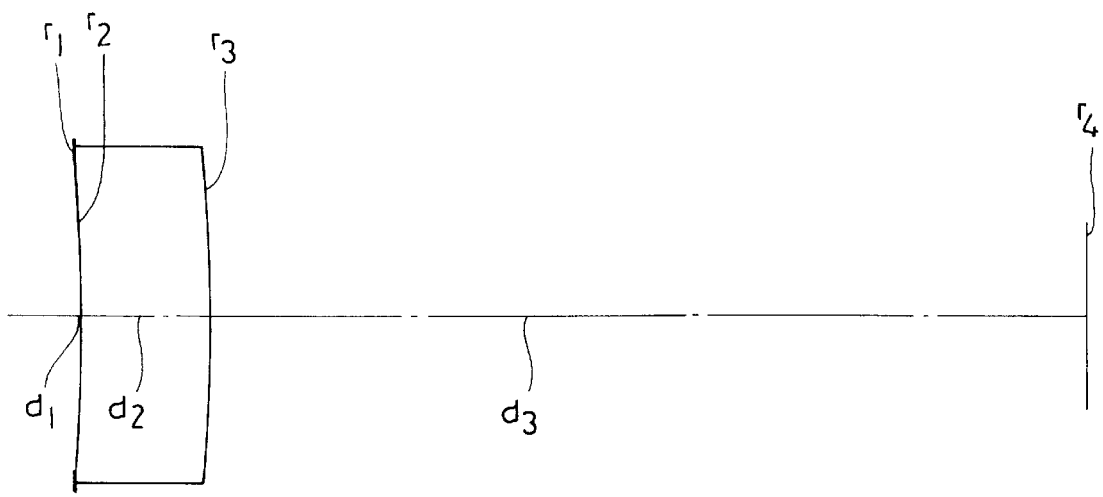
FIGS. 1 through 19 show sectional views illustrating compositions of first through nineteenth embodiments of the optical system according to the present invention.

Out of the embodiments described above, the first embodiment has a composition illustrated in FIG. 1, or is an optical system consisting of a single radial type gradient index lens component which has a concave surface on the object side, a positive refractive power and a meniscus shape. The optical system preferred as the first embodiment has a narrow field angle and a long focal length. Though an optical system which has such a composition can hardly correct longitudinal chromatic aberration in particular, the optical system according to the present invention corrects longitudinal chromatic aberration favorably with the radial type gradient index lens component. Further, the radial type gradient index lens component satisfies the condition (1), whereby the optical system preferred as the first embodiment favorably corrects chromatic aberration at the four wavelengths of the d-line, C-line, F-line and g-line. The radial type gradient index lens component used in this optical system has a positive refractive power and favorably corrected chromatic aberration.

The optical system preferred as the first embodiment which consists of the radial type gradient index lens component is applicable to a variety of optical systems. The optical system preferred as the first embodiment is applicable, for example, as an optical system for silver salt cameras and video cameras. Further, it is usable in optical systems each composed of a plurality of lens components.

Though the first embodiment consists of a single lens component, it favorably corrects longitudinal chromatic aberration.

Figure 2:
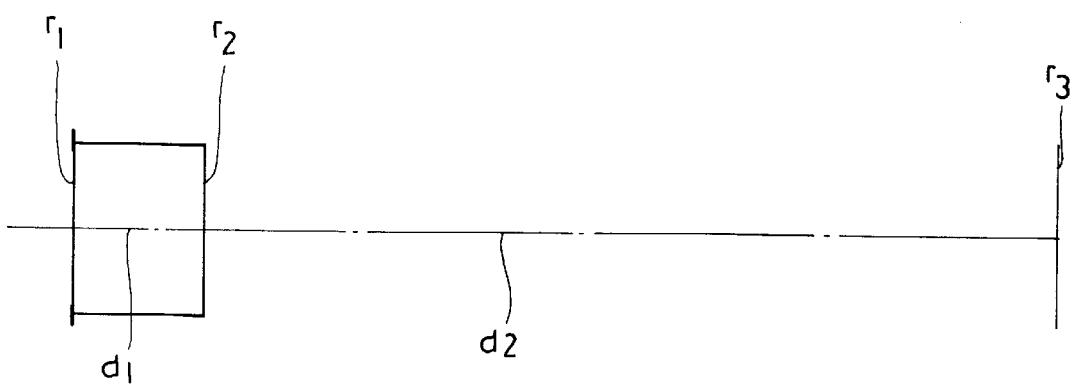

The second embodiment has a composition illustrated in FIG. 2, or is composed of a single radial type gradient index lens component which has two planar surfaces (the surfaces $r_1$ and $r_2$) and a positive refractive power. Like the first embodiment, the second embodiment has a narrow field angle and a long focal length. Though such an optical system can hardly correct longitudinal chromatic aberration in particular, the second embodiment favorably corrects longitudinal chromatic aberration with the radial type gradient index lens component. Since the radial type gradient index lens component has the two planar surfaces, it can easily be polished, and the second embodiment is advantageous from viewpoints of influences due to eccentricity and a manufacturing cost thereof.

The optical system preferred as the second embodiment is applicable as an optical system for silver salt cameras and video cameras. It is usable also as a lens element of an optical system composed of a plurality of lens components.

The second embodiment favorably corrects longitudinal chromatic aberration though it is composed of a single lens component.

Figure 3:
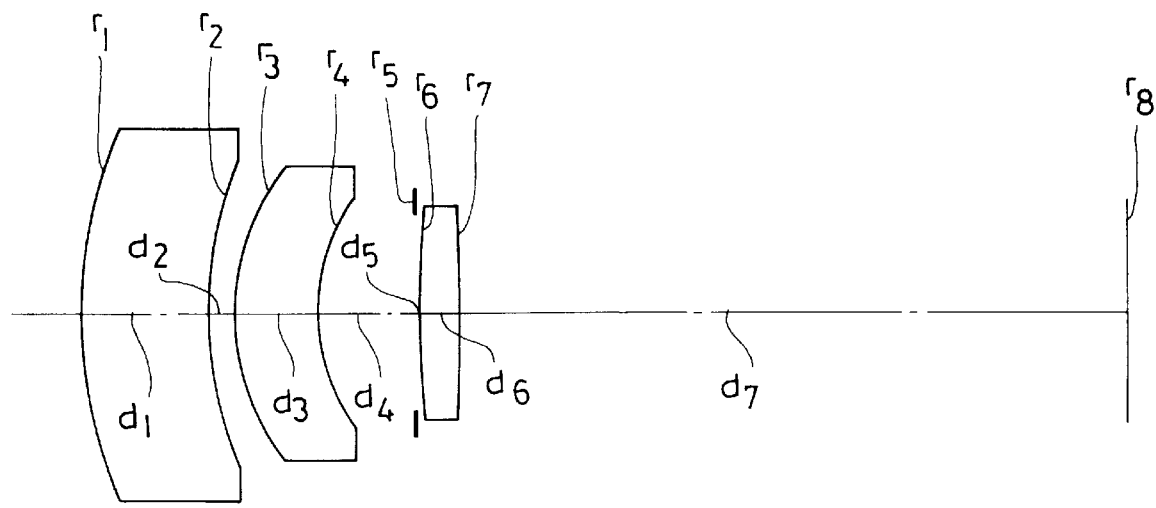

The third embodiment has a composition shown in FIG. 3, or is a triplet type optical system which is composed, in order from the object side, of a positive lens component, a negative lens component and a positive lens component. Speaking more concretely, the third embodiment is composed, in order from the object side, of a first meniscus lens component having a concave surface on the image side, a second meniscus lens component having a concave surface on the image side and a third biconvex lens component. Further, a stop is disposed between the second lens component and the third lens component.

The third embodiment favorably corrects longitudinal chromatic aberration in particular by using a radial type gradient index lens component. That is to say, the first lens unit which is disposed on the object side is a radial type gradient index lens component.

Though the third embodiment has a narrow field angle and hardly allows correction of longitudinal chromatic aberration in particular, longitudinal chromatic aberration is corrected favorably by using the radial type gradient index lens component described above.

The third embodiment is usable as an optical system for silver salt cameras and video cameras.

Figure 4:
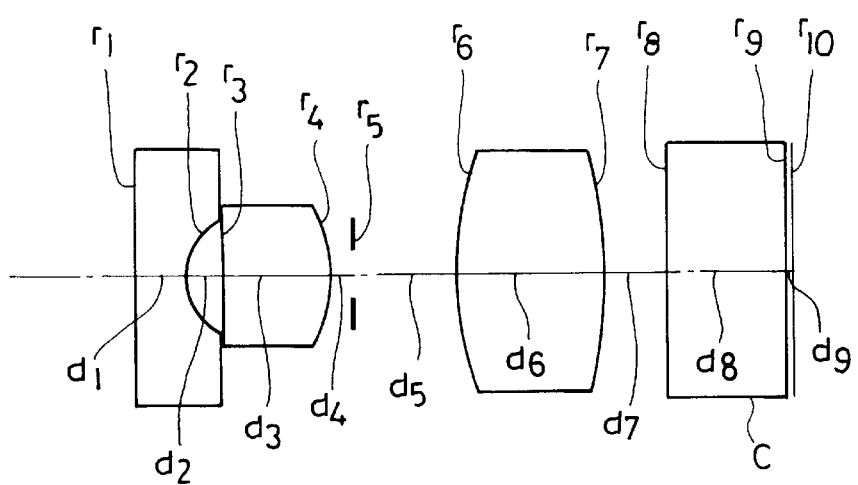

The fourth embodiment has a composition shown in FIG. 4, or is a retrofocus type optical system which is composed of a negative lens component, a positive lens component and a positive lens component in order from the object side. A stop is disposed between the positive lens component and the positive lens component. Speaking more concretely, the fourth embodiment is composed, in order from the object side, of a first plano-concave lens component, a second plano-convex lens component having a main function to correct lateral chromatic aberration, a stop and a third biconvex lens component having a main imaging function: the third lens component being a radial type gradient index lens component. A piano parallel plate C disposed on the image side is a protective glass plate.

The optical system preferred as the fourth embodiment has a wide field angle and is usable as an objective lens system for endoscopes or a lens system for video camera. Though lateral chromatic aberration can hardly be corrected in the fourth embodiment which has the wide field angle, lateral chromatic aberration is corrected favorably in the fourth embodiment by using the radial type gradient index lens component.

Though coma produced by an image side positive lens component disposed on the image side of a stop (a third lens component) in particular can hardly be corrected in an optical system which has a composition like that of the fourth embodiment, this embodiment favorably corrects coma produced by surfaces by configuring this lens component as a gradient index lens component which has a characteristic to lower a refractive index from an optical axis in a radial direction. In other words, coma is corrected favorably in the fourth embodiment by imparting a positive refractive power to a medium of the radial type gradient index lens component. Further, it is possible to correct not only coma but also distortion by configuring a radial type gradient index lens component as described above.

For correcting coma favorably with a medium of a radial type gradient index lens component, it is desirable to satisfy the following condition (6):

$$-0.1 < \sum_{i=2}^{n} N_{id} D_e^{2i} < 0.2 \tag{6}$$

wherein the reference symbol De represents a maximum effective diameter.

If the lower limit of −0.1 of the condition (6) is exceeded, coma will be undercorrected. If the upper limit of 0.2 of the condition (6) is exceeded, coma will be over-corrected.

For correcting coma more favorably it is desirable to satisfy, in place of the condition (6), the following condition (6-1):

$$0 < \sum_{i=2}^{n} N_{id} D_e^{2i} < 0.1 \tag{6-1}$$

Coma will be undercorrected if the lower limit of 0 of the condition (6-1) is exceeded as in the case where the lower limit of the condition (6) is exceeded. If the upper limit of 0.1 of the condition (6-1) is exceeded, coma will be over-corrected.

For correcting lateral chromatic aberration in an optical system which has a relatively wide field angle like the fourth embodiment, it is desirable to use, at a location on the object side of a stop, a positive lens component which satisfies the following condition (7):

$$0.022 < 1/v_p \tag{7}$$

wherein the reference symbol $v_p$ represents an Abbe's number of the positive lens component used on the object side of the stop.

If the condition (7) is not satisfied, lateral chromatic aberration will be undercorrected. The second lens component of the fourth embodiment corresponds to the positive lens component described above.

For correcting lateral chromatic aberration more favorably, it is desirable to satisfy, in place of the condition (7), the following condition (7-1):

$$0.028 < 1/v_p \tag{7-1}$$

If the condition (7-1) is not satisfied, lateral chromatic aberration will be undercorrected.

For obtaining an optical system which has a wider field angle, it is desirable to satisfy, in place of the condition (7) or (7-1), the following condition (7-2):

$$0.033 < 1/v_p \tag{7-2}$$

Further, an effect to prevent adhesion of foreign matter such as dust can be obtained by configuring an object side surface of an optical system as a planar surface.

Since the fourth embodiment can be compact and have a wide field angle by using a radial type gradient index lens component as described above, it is effective to apply to fourth embodiment an optical system for image pickup devices for portable TV telephones, portable information input units. These appliances are equipped with image displays, batteries, memories, etc. but must have improved portability. It is therefore desired to configure extremely compact optical systems which are to be used in these appliances. Further, higher optical performance is demanded for optical systems to be used in these appliances. Though a compact optical system which has high optical performance can hardly be composed of homogeneous lens components having small freedom for correction of aberrations, the fourth embodiment is configured so as to meet the requirements described above by using a radial type gradient index lens component.

Furthermore, it is possible to configured a radial type gradient index lens component so as to have a function to cut off components having specfic wavelengths in an optical system. When an image pickup device such as a CCD which has high sensitivity in the infrared wavelength region is used on an image pickup surface, for example, it is desirable to configure a radial type gradient index lens component so as to have a function to cut off components having wavelengths in the infrared region.

Moreover, it is possible to dispose, on a planar surface of a lens component or a flat plate, an interference membrane which cuts off components having specific wavelengths. For example, an interference membrane can be disposed on an object side surface of the second lens component of the fourth embodiment. Further, a stop can be made of a thin sheet.

In addition, it is possible, by configuring a radial type gradient index lens component so as to have two convex surfaces, to share a refractive power between the two surfaces, thereby reducing amounts of aberrations.

Figure 5:
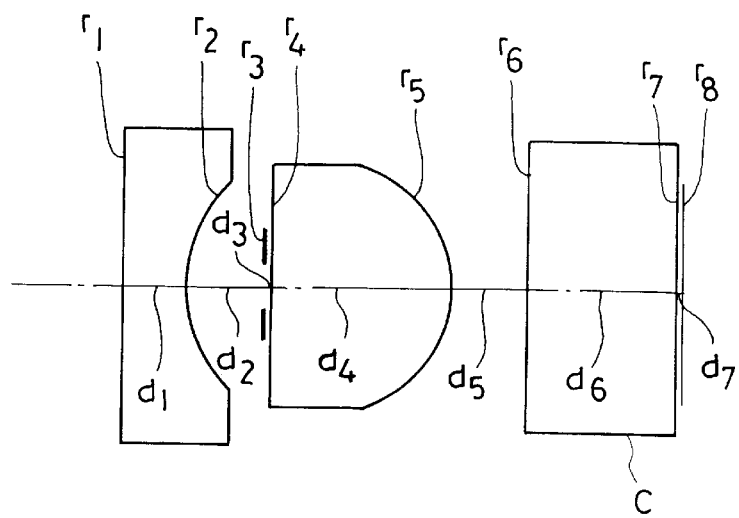

The fifth embodiment is a retrofocus type optical system which is composed of a negative lens component and a positive lens component as shown in FIG. 5. A stop is disposed between the negative lens component and the positive lens component. Speaking more concretely, the fifth embodiment is composed, in order from the object side, of a first plano-concave lens component having a function to widen a field angle, a stop and a second plano-convex lens component having an imaging funtion: the second lens component being a radial type gradient index lens component. A plano parallel plate C disposed on the image side is a cover glass plate for an image pickup device.

The fifth embodiment is an optical system which has a wide field angle and is to be used as an objective lens system for endoscopes or a lens system for video cameras. Though it is rather hard to correct lateral chromatic aberration in particular in the optical system preferred as the fifth embodiment, lateral chromatic aberration is corrected favorably in the fifth embodiment by using the radial type gradient index lens component. This radial type gradient index lens component is configured as the plano-convex lens component which has a planar surface and high productivity, thereby making it possible to manufacture the optical system at a low cost.

Since the radial type gradient index lens component has a positive refractive power, it has a function to correct a Petzval's sum.

Figure 6:
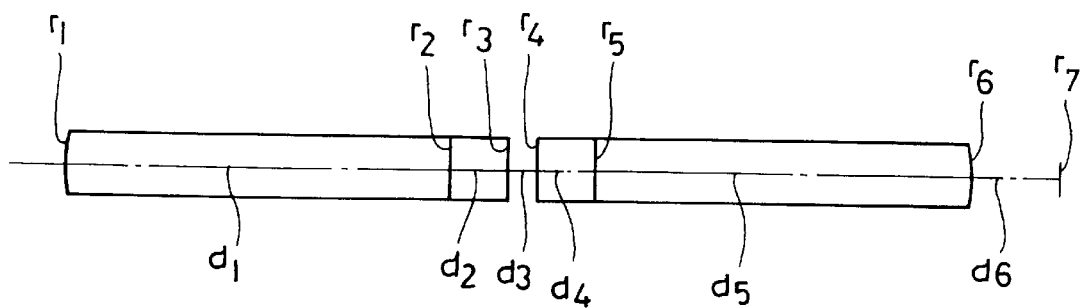

The sixth embodiment has a composition illustrated in FIG. 6, or is an image transmitting optical system which is composed, in order from the object side, of a positive lens element, a positive lens element, a positive lens element and a positive lens element. Speaking more detailedly, the sixth embodiment is composed, in order from the object side, of a first convex-planar lens element, a second biplanar lens element, a third biplanar lens element and a fourth plano-convex lens element: the second lens element and the third lens element being radial type gradient index lens elements. In the sixth embodiment, longitudinal chromatic aberration in particular is corrected favorably by these radial type gradient index lens elements.

The sixth embodiment is usable as an optical system such as a relay optical system for non-flexible endoscopes which require image formation at a magnification of approximately 1x. Further, the first lens element is cemented or kept in close contact to or with the second lens element in the front lens component and the third lens element is cemented or kept in close contact to or with the fourth lens element in the rear lens component for reducing air contact surfaces in the optical system, thereby enhancing transmittance. Further, the sixth embodiment has a composition in which the front lens component is nearly symmetrical with the rear lens component, thereby favorably correcting offaxial aberrations such as lateral chromatic aberration, coma and distortion in particular.

The optical system preferred as the sixth embodiment is configured to relay an image a single cycle and can be disposed in a plurality on an optical axis for composing a relay optical system which relays an image a plurality of cycles. Further, these relay optical system can be used in combination with an objective optical system or an eyepiece optical system.

For correcting chromatic aberration more favorably in the sixth embodiment, it is desirable to satisfy the following condition (2-3):

$$-0.05 < 1/V_1 < 0.03 \tag{2-3}$$

When the condition (2-3) is satisfied, it is possible to correct longitudinal chromatic aberration favorably at the three wavelengths of the d-line, C-line and F-line. If the upper limit of 0.03 of the condition (2-3) is exceeded, longitudinal chromatic aberration will be undercorrected. If the lower limit of −0.05 of the condition (2-3) is exceeded, longitudinal chromatic aberration will be overcorrected.

When a minuter image is demanded, it is desirable to satisfy, in place of the condition (2-3), the following condition (2-4).

$$-0.02 < 1/V_1 < 0.01 \quad (2\text{-}4)$$

For correcting chromatic aberration more favorably, it is desirable to satisfy the following condition (3-3):

$$-0.06 < 1/V_1(g) < 0.045 \quad (3\text{-}3)$$

When the above-mentioned condition (3-3) is satisfied, it is possible to correct longitudinal chromatic aberration favorably at the three wavelengths of the d-line, F-line and g-line. If the upper limit of 0.045 of the condition (3-3) is exceeded, longitudinal chromatic aberration will be undercorrected. If the lower limit of −0.06 of the condition (3-3) is exceeded, in contrast, longitudinal chromatic aberration will be overcorrected.

Further, it is desirable that $1/V_1(g)$ satisfies the following condition (3-4):

$$-0.03 < 1/V_1(g) < 0.02 \quad (3\text{-}4)$$

Furthermore, it is desirable for correcting chromatic aberration to satisfy, in place of the above-mentioned condition (3-4), the following condition (3-5):

$$-0.02 < 1/V_1(g) < 0.01 \quad (3\text{-}5)$$

Figure 7:
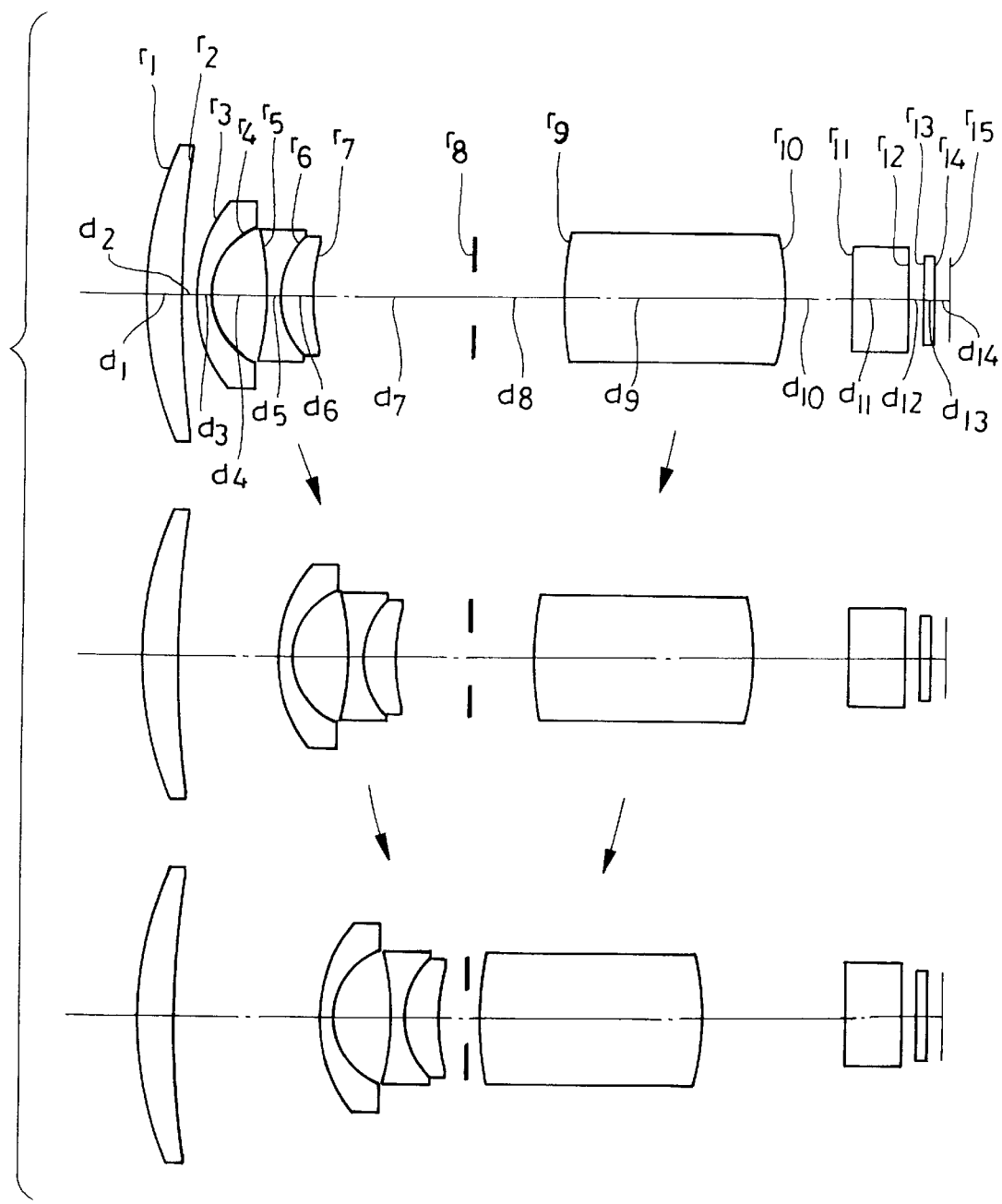

The seventh embodiment has a composition illustrated in FIG. 7, or is a zoom lens system which is composed of three lens units, i.e., a positive lens unit, a negative lens unit and a positive lens unit. The seventh embodiment is an example of zoom lens system in which longitudinal chromatic aberration in particular is corrected favorably by using a radial type gradient index lens component. The first positive lens unit is kept stationary during a change of a magnification, and has a function to allow axial and offaxial light bundles to be incident onto the second lens unit while converging, whereas the second lens unit and the third lens unit are movable for the change of the magnification, and have functions to change a magnification and correct a deviation of an image surface caused due to the change of the magnification.

Speaking of compositions of the lens units, the first lens unit is composed of a positive meniscus lens component having a concave surface on the image side in order from the object side, the second lens unit is composed of a negative lens component, and a cemented lens component consisting of a negative lens element and a positive lens element in order from the object side, and the third lens unit is composed of a single radial type gradient index lens component. Since the third lens unit has a main imaging function and tends to produce longitudinal chromatic aberration in a large amount, a radial type gradient index lens component is used for favorably correcting longitudinal chromatic aberration.

When a radial type gradient index lens component according to the present invention is to be used in a zoom lens system as in the seventh embodiment, it is desirable to configure the lens component so as to satisfy the conditions (1) and (2) at the same time.

For reducing variations of aberrations in a zoom optical system to be caused by zooming, it is ordinarily desirable that aberrations are corrected favorably in each of lens units which are to be used for composing the zoom optical system. Accordingly, it is desired for correction of chromatic aberration that the primary spectrum and the secondary spectrum are corrected in each of the lens units. It is therefore desirable to configure a radial type gradient index lens component so as to satisfy the conditions (1) and (2) at the same time when the lens component is to be used in a zoom optical system. A similar effect can be obtained by configuring a radial type gradient index lens component so as to satisfy the conditions (2) and (3) at the same time. When only one radial type gradient index lens component is to be used in an optical system, it is desirable to configure the lens component so as to satisfy the condition (1).

Figure 8:
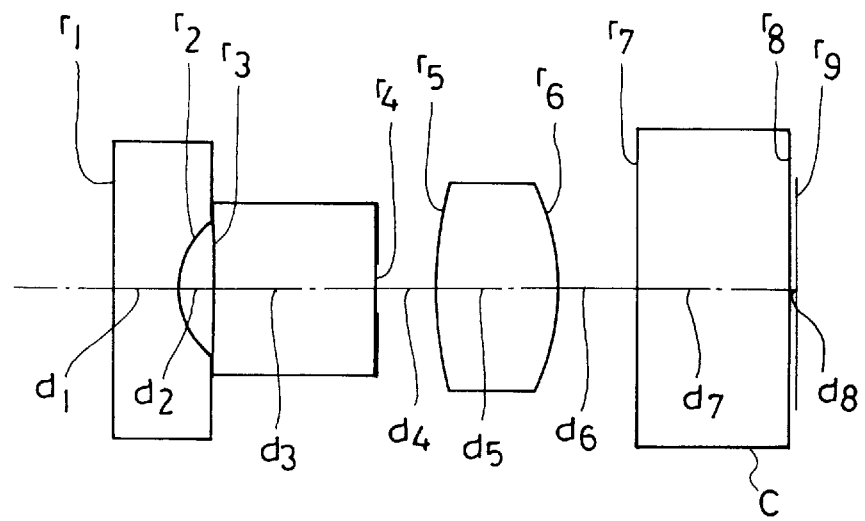

The eighth embodiment is a retrofocus type optical system which is composed, in order from the object side, of a negative lens component, a positive lens component and a positive lens component as shown in FIG. 8, and comprises a stop disposed between the positive lens component and the positive lens component. Speaking more concretely, this optical system is composed, in order from the object side, of a first lens component which has a plano-concave shape and a function to widen a field angle, a second lens component which has two planar surfaces and a main function to correct lateral chromatic aberration produced by the first lens component, and a third lens component which has a biconvex shape and a main imaging function: the second lens component being a radial type gradient index lens component. Further, a plane parallel plate disposed on the image side is a cover glass plate.

The eighth embodiment is an optical system which has a wide field angle and is usable as an objective lens system for endoscopes and video cameras. Though it is rather hard to correct lateral chromatic aberration in this optical system which has a wide field angle, lateral chromatic aberration is corrected favorably by using a radial type gradient index lens component.

The radial type gradient index lens component has the biplanar shape which is preferable for enhancing productivity and lowering a manufacturing cost.

For correcting lateral chromatic aberration in the eighth embodiment in which the radial type gradient index lens component is disposed on the object side of the stop, it is desirable to satisfy the following condition (2-5):

$$0.02 < 1/V_1 < 0.5 \quad (2\text{-}5)$$

If the upper limit of 0.5 of the condition (2-5) is exceeded, lateral chromatic aberration will be undercorrected. If the lower limit of 0.02 of the condition (2-5) is exceeded, lateral chromatic aberration will be overcorrected.

For correcting lateral chromatic aberration more favorably by disposing a radial type gradient index lens element on the object side of a stop as in the eighth embodiment, it is desirable to satisfy the following condition (2-6):

$$0.015 < 1/V_1 < 0.1 \quad (2\text{-}6)$$

If the lower limit of 0.015 of the condition (2-6) is exceeded, lateral chromatic aberration will be undercorrected. If the upper limit of 0.1 of the condition (2-6) is exceeded, lateral chromatic aberration will be overcorrected.

When manufacturing facility of a material for the radial type gradient index lens component is taken into consideration, it is desirable that $1/V_1$ has a value not exceeding 0.08.

When durability of the lens components is considered, it is desirable to make all the lens components of a glass material.

Figure 9:
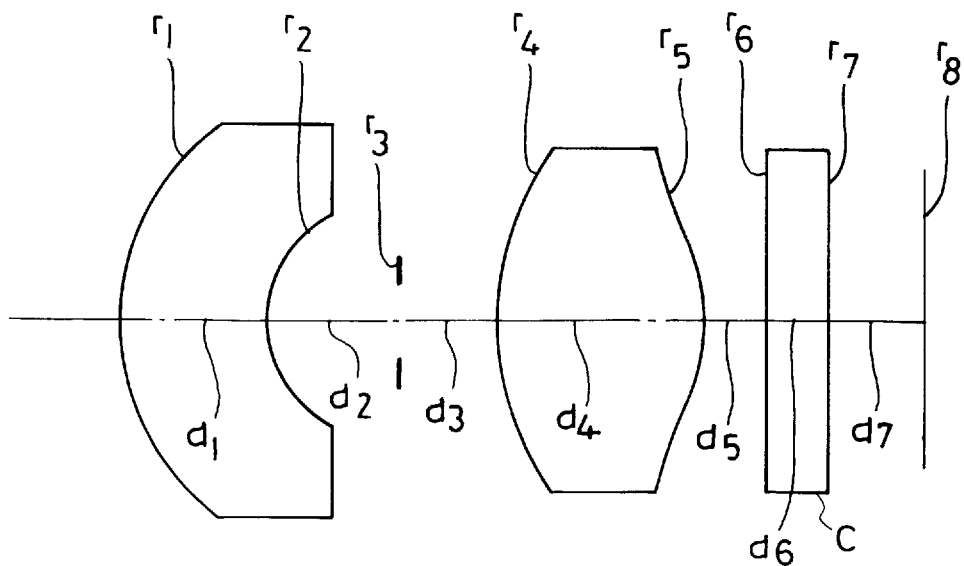

The ninth embodiment has a composition shown in FIG. 9, or is a retrofocus type optical system which is composed of a negative lens component and a positive lens component, and comprises a stop disposed between these lens components. Further, a plane parallel plate C is disposed as a cover glass plate.

The ninth embodiment has a wide field angle and is to be used as an objective lens system for endoscopes and video cameras. Though it is rather hard to correct lateral chromatic aberration in the ninth embodiment which has a wide field angle, lateral chromatic aberration is favorably corrected by the radial type gradient index lens component used as the first lens component.

Further, offaxial aberrations are favorably corrected by configuring the radial type gradient index lens component used as the first lens component so as to have a meniscus shape having a concave surface on the side of the stop.

Furthermore, offaxial aberrations, coma in particular, which pose problems in an optical system having a wide field angle are corrected favorably by using an aspherical surface on the first lens component disposed on the object side of the stop. This aspherical surface has such a shape as to weaken a positive refractive power as portions of the aspherical surface are farther from an optical axis toward a margin, thereby favorably correcting also distortion. This lens component can have two planar surfaces so that optical performance of the optical system less influenced doe to eccentricity.

A shape of the aspherical surface used in the optical system according to the present invention can be expressed by the following formula:

$$x = \frac{y^2/r}{1 + \sqrt{1 - (1+K)(y/r)^2}} + \sum_{i=1}^{n} A_{2i} y^{2i}$$

wherein an optical axis is taken as the x axis, a direction perpendicular to the optical axis is taken as the y axis, the reference symbol r represents a radius of curvature on the optical axis, and the reference symbols K and $A_{2i}$ designate aspherical surface coefficients.

Since the ninth embodiment is configured as a compact optical system which has a wide field angle, is composed of a small number of lens components, and has favorably corrected aberrations such as chromatic aberration and coma, it is effective to apply this optical system to optical systems of image intake devices for portable TV telephones and portable information input units. Appliances such as portable TV telephones which comprises image displays, batteries, calculating units and memories require a compact optical system composed of a small number of lens components for improving portability. The optical system must have high optical performance and have favorably corrected aberrations. These requirements can hardly be met with homogeneous spherical lens components which have small freedom for correction of aberrations. The ninth embodiment which uses the aspherical surface meets these requirements and is effectively usable as an optical system for portable TV telephones and other appliances.

Figure 10:
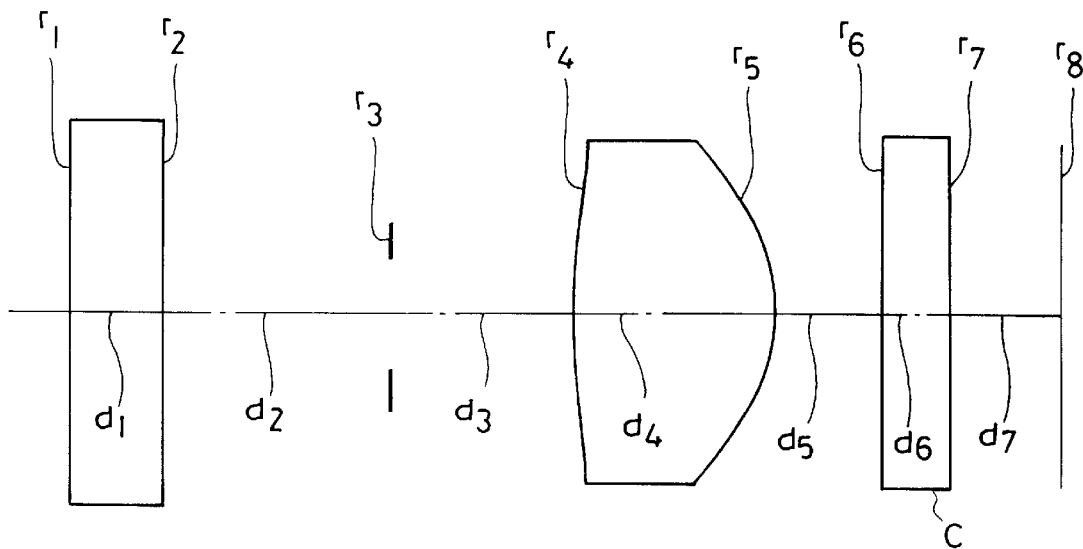

The tenth embodiment has a composition illustrated in FIG. 10, or is a retrofocus type optical system which is composed, in order from the object side, of a negative lens component and a positive lens component, and comprises a stop disposed between the negative lens component and the positive lens component. Speaking in more details, the tenth embodiment is composed, in order from the object side, of a first lens component which has two planar surfaces and a function to widen a field angle, a stop, and a second lens component which has a biconvex shape and a function mainly for imaging: the first lens component being a radial type gradient index lens component. A plane parallel plate C is disposed on the image side as a cover glass plate.

The tenth embodiment has a wide field angle and is used as an objective optical system for endoscopes op an optical system for video cameras. Though it is rather hard to correct lateral chromatic aberration in particular in the tenth embodiment which has the wide field angle, lateral chromatic aberration is corrected favorably by using the radial type gradient index lens component.

Figure 11:
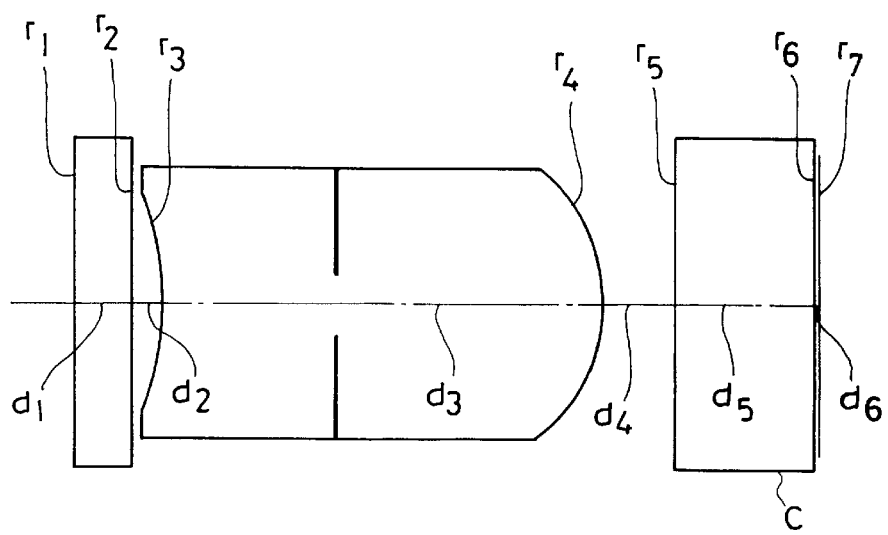

The eleventh embodiment is composed of a single radial type gradient index lens component as shown in FIG. 11. Speaking more concretely, the eleventh embodiment is composed of a radial type meniscus gradient index lens component having a concave surface on the object side and comprises a stop disposed at a location 0.9471 mm as measured from the object side surface of the radial type gradient index lens component toward the image side. The radial type gradient index lens component is made of a medium having a positive refractive power.

The optical system preferred as the eleventh embodiment has a wide field angle and is to be used as an objective optical system for endoscopes or an optical system for video cameras.

Though it is rather hard to correct lateral chromatic aberration also in the optical system preferred as the eleventh embodiment, lateral chromatic aberration is corrected favorably by the radial type gradient index lens component.

Further, offaxial aberrations are favorably corrected by disposing the stop in the radial type gradient index lens component, thereby improving symmetry of a refractive power of medium.

In this embodiment also, a planar glass plate C is disposed on the object side as a cover glass plate.

Furthermore, the eleventh embodiment satisfies the above-mentioned condition (2-5) for correcting lateral chromatic aberration produced by the object side concave surface or the image side convex surface by the medium disposed on the object side of the stop.

For reducing chromatic aberration to be produced by the surfaces of the radial type gradient index lens component, it is desirable to select a value not less than 30, preferably not less than 40, for $V_0$ of the radial type gradient index lens component.

When correction of a Petzval's sum is taken into consideration, it is desirable to configure the radial type gradient index lens component so as to have a refractive index $N_0$ of at least 1.55 on an optical axis. For correcting a Petzval's sum more favorably, it is desirable that the radial type gradient index lens component has a refractive index of at least 1.6 on the optical axis. For obtaining an optical system having a field angle which is especially wide, it is desirable that the refractive index $N_0$ of the radial type gradient index lens component on the optical axis is at least 1.65.

Figure 12:
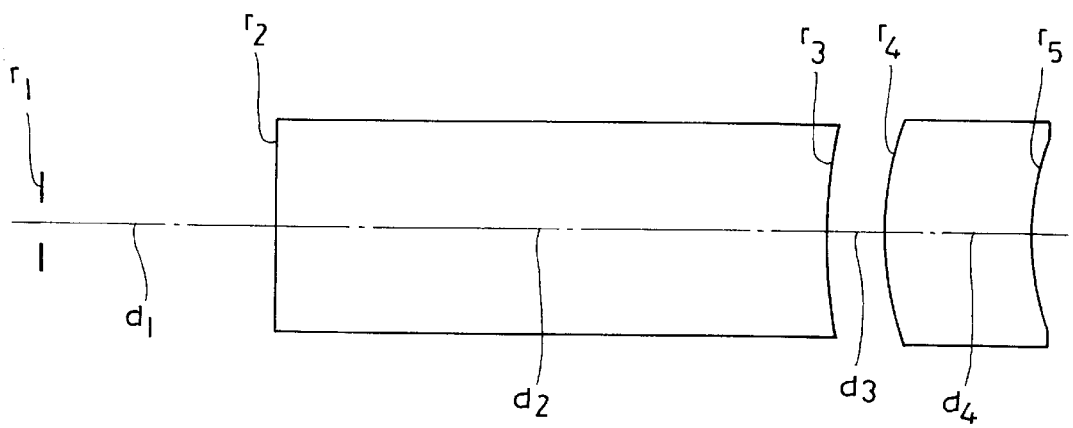

The twelfth embodiment is composed, in order from the object side, of a positive lens component and a positive lens component as shown in FIG. 12. Speaking more detailedly, the twelfth embodiment is composed, in order from the object side, of a first plano-concave lens component and a second meniscus lens component having a concave surface on the image side. Both the first and second lens components are radial type gradient index lens components.

The twelfth embodiment is an example wherein the optical system according to the present invention is applied as an objective optical system for microscopes and lateral chromatic aberration is corrected favorably by radial type gradient index lens components in an objective optical system for microscopes which hardly allows correction of lateral chromatic aberration in particular.

When the twelfth embodiment is to be applied as an optical system for which prevention of lowering of transmittance or production of flare is important, it is desirable to configure the radial type gradient index lens components so as to have thickness not exceeding 50 mm. It is more desirable to configure the radial type gradient index lens component so as to have thickness not exceeding 30 mm. The second lens component is configured so as to satisfy the condition (2-5), thereby correcting mainly lateral chromatic aberration favorably in the twelfth embodiment.

Figure 22:
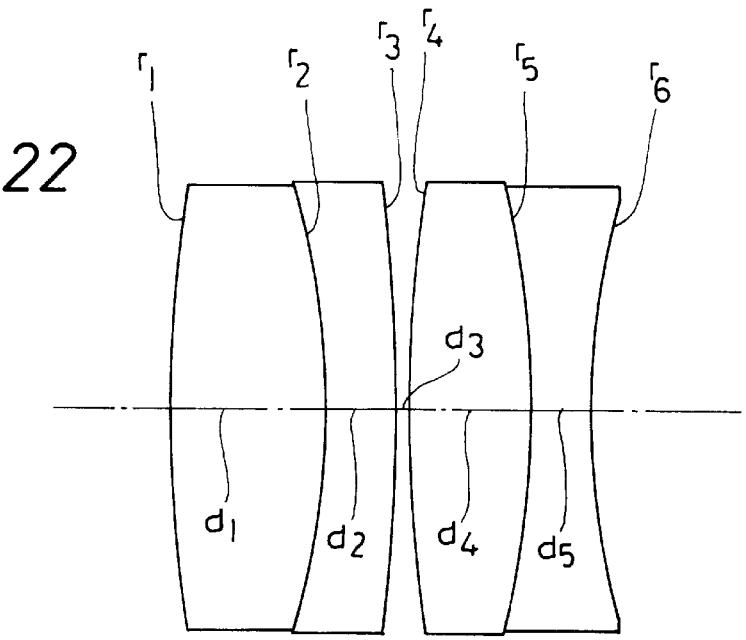
FIG. 22 shows a sectional view illustrating an imaging lens system which is to be used in combination with an objective lens system for microscopes such as the twelfth embodiment of the present invention.

The twelfth embodiment is an objective lens system which has an image point at infinite distance or allows a parallel light bundles to emerge therefrom and does not form an image by itself. Therefore, the twelfth embodiment is used in combination with an imaging lens system which has, for example, a composition shown in FIG. 22 and numerical data listed below:

$r_1 = 68.7540$
$\quad d_1 = 7.7320 \quad n_1 = 1.48700 \quad v_1 = 70.20$
$r_2 = -37.5670$
$\quad d_2 = 3.4740 \quad n_2 = 1.80600 \quad v_2 = 40.90$
$r_3 = -102.8470$
$\quad d_3 = 0.6970$
$r_4 = 84.3090$
$\quad d_4 = 6.0230 \quad n_3 = 1.83400 \quad v_3 = 37.10$
$r_5 = -50.7100$
$\quad d_5 = 3.0290 \quad n_4 = 1.64400 \quad v_4 = 40.80$
$r_6 = 40.6610$ The twelfth embodiment is combined with the imaging lens system shown in FIG. 22 with an airspace of 120 mm reserved therebetween. This airspace may not be 120 mm, and optical performance of the optical system remains substantially unchanged so far as the airspace is within a range from 50 to 170 mm.

Figure 13:
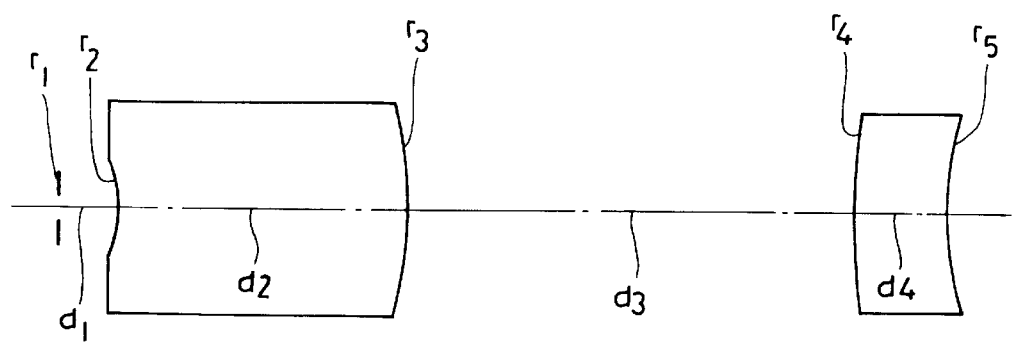

The thirteenth embodiment is composed, in order from the object side, of a positive lens component and a negative lens component as shown in FIG. 13. Speaking in more details, the thirteenth embodiment is composed, in order from the object side, of a first meniscus lens component having a concave surface on the object side and a second meniscus lens component having a concave surface on the image side: both the first and second lens components being radial type gradient index lens components.

The thirteenth embodiment is also an example wherein the optical system according to the present invention is applied as an objective optical system for microscopes and has longitudinal chromatic aberration which is corrected by the radial type gradient index lens components like that in the twelfth embodiment. Further, a Petzval's sum is corrected favorably by imparting a positive refractive power to a medium of the radial type gradient index lens component and configuring it so as to have a shape of a negative lens component.

Figure 14:
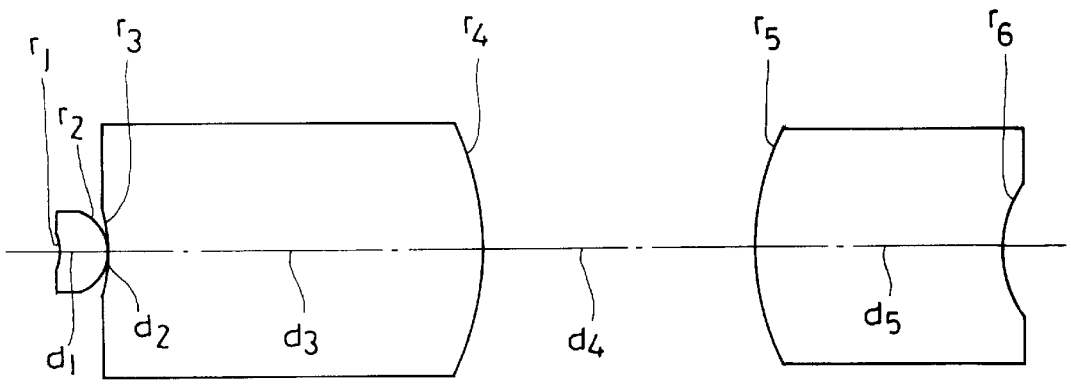

The fourteenth embodiment is composed, in order from the object side, of a positive lens component, a positive lens component and a negative lens component as shown in FIG. 14. Speaking more concretely, the fourteenth embodiment is composed, in order from the object side, of a first meniscus lens component having a concave surface on the object side, a second meniscus lens component having a concave surface on the object side and a third meniscus lens component having a concave surface on the image side: the second lens component being a radial type gradient index lens component. By using the radial type gradient index lens component as described above, longitudinal chromatic aberration is corrected favorably in the objective lens system for microscopes which hardly allows correction of longitudinal chromatic aberration. Spherical aberration in particular is corrected favorably by configuring the first lens component as the meniscus lens component having the concave surface on the object side.

Figure 15:
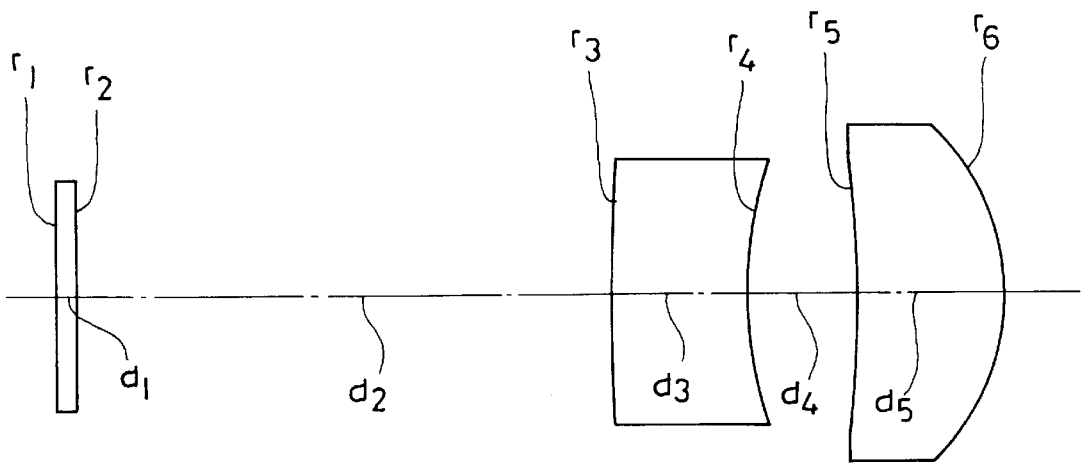

The fifteenth embodiment is composed, in order from the object side, of a negative lens component and a positive lens component as shown in FIG. 15. Speaking in more details, the fifteenth embodiment is composed, in order from the object side, of a first meniscus lens component having a concave surface on the image side and a second meniscus lens component having a concave surface on the object side: the first lens component being a radial type gradient index lens component.

In the fifteenth embodiment also, the optical system according to the present invention is applied as an objective optical system for microscopes. Though the fifteenth embodiment is composed only of the two lens components including a radial type gradient index lens component, aberrations are corrected favorably in this embodiment. Though it is rather hard to correct longitudinal chromatic aberration in an objective optical system for microscopes, longitudinal chromatic aberration is corrected favorably in the fifteenth embodiment by using the radial type gradient index lens component.

The optical systems preferred as the thirteenth, fourteenth and fifteenth embodiments are also configured so as to have image point at infinite distance. Accordingly, each of these embodiments is used in combination with an imaging lens system such as that shown in FIG. 22. Each of the thirteenth, fourteenth and fifteenth embodiments is combined with the imaging lens system shown in FIG. 22 with an airspace of 120 mm reserved therebetween. However, this airspace may not be 120 mm, or optical performance of each of the thirteenth, fourteenth and fifteenth embodiments remains substantially unchanged from that of the twelfth embodiment so as an airspace of 50 mm to 170 mm is reserved between the optical system and the imaging lens system.

Figure 16:
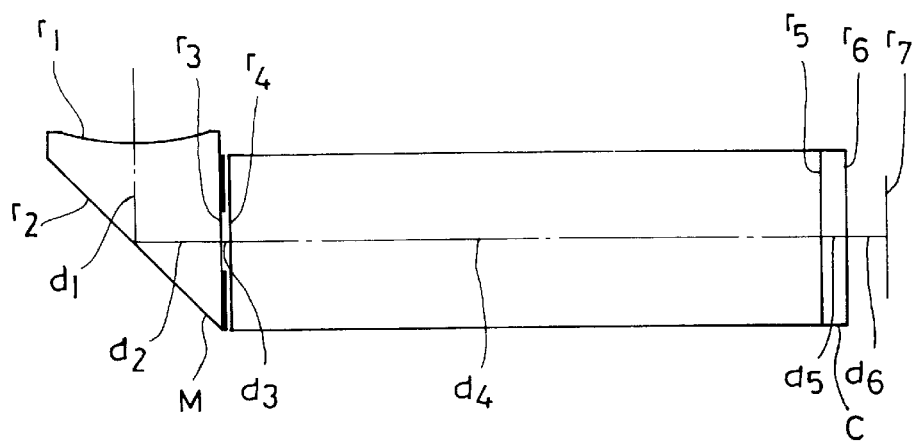

The sixteenth embodiment is composed, in order from the object side, of a negative lens component and a positive lens component as shown in FIG. 16. Speaking more concretely, the sixteenth embodiment is composed, in order from the object side, of a first concavo-planar lens component including a reflecting surface M and a second lens component which is a radial type gradient index lens component having two planar surfaces. Further, a stop is disposed between the first lens component and the second lens component, and a plane parallel plate C is disposed on the image side as a cover glass plate.

The sixteenth embodiment is usable as an objective lens system for microscopes or an optical system for video cameras. Further, a reflecting surface M disposed in the optical system makes it possible to configure the optical system compact and facilitates to assemble the optical system by cementing an image side surface of the first lens component to the radial type gradient index lens component. Further, a cover glass plate C is cemented to an image side surface of the radial type gradient index lens component (second lens component). When a radial type gradient index lens component is to be cemented to another optical element, it is possible to use the radial type gradient index lens component in a condition where it has a sand-blasted cementing surface, thereby simplifying a working stage of the radial type gradient index lens component.

Figure 17:
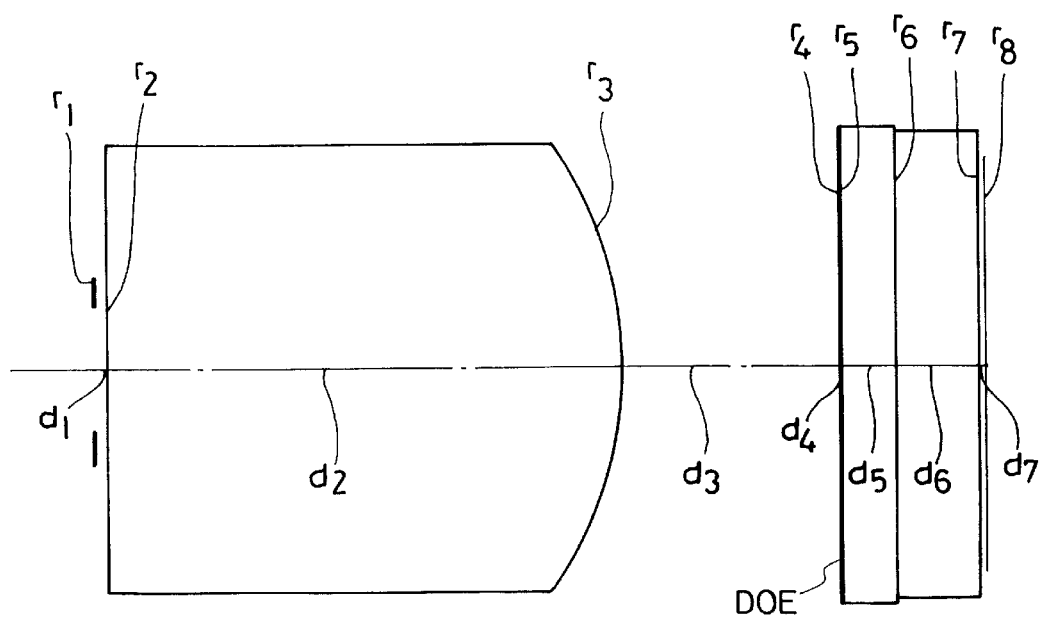

The seventeenth embodiment is composed, in order from the object side, of a positive lens component and a positive lens component as shown in FIG. 17. Speaking more detailedly, the seventeenth embodiment is composed, in order from the object side, of a first radial type gradient index lens component and a second diffraction type optical element (DOE), and comprises a stop disposed on the object side of an object side surface of the first lens component. The seventeenth embodiment is an optical systems in which aberrations are corrected favorably with a radial type gradient index lens component and a diffraction type optical element.

A diffraction type optical element is equivalent to a lens component which has a remarkably high imaginary refractive index as described in literature "SPIE", Vol. 126, pages on and after 46 (1977), a radii of curvature, thickness, a refractive index, an Abbe's number and aspherical surface coefficients of this lens component including aberrations to be produced are listed in the numerical data of the seventeenth embodiment.

In the seventeenth embodiment, the first radial type gradient index lens component has a main imaging function and the second diffraction type optical element functions mainly for correcting lateral chromatic aberration.

The seventeenth embodiment is an optical system which is composed of a small number of lens components, has a wide field angle and favorably corrects lateral chromatic aberration in particular by the diffraction type optical element disposed on the image side of the stop. The diffraction type optical element has a positive refractive power and is disposed on the image side of the radial type gradient index lens component, thereby correcting lateral chromatic aberration which is produced by a convex surface of the radial type gradient index lens component.

The optical system preferred as the seventeenth embodiment is used as an objective lens system for endoscopes or an optical system for video cameras. It is effective to use this optical system in portable TV telephones or portable information input units since the optical system has a wide field angle, is composed of a small number of lens components, and corrects aberrations such as chromatic aberration and coma by using the diffraction type optical element.

Figure 18:
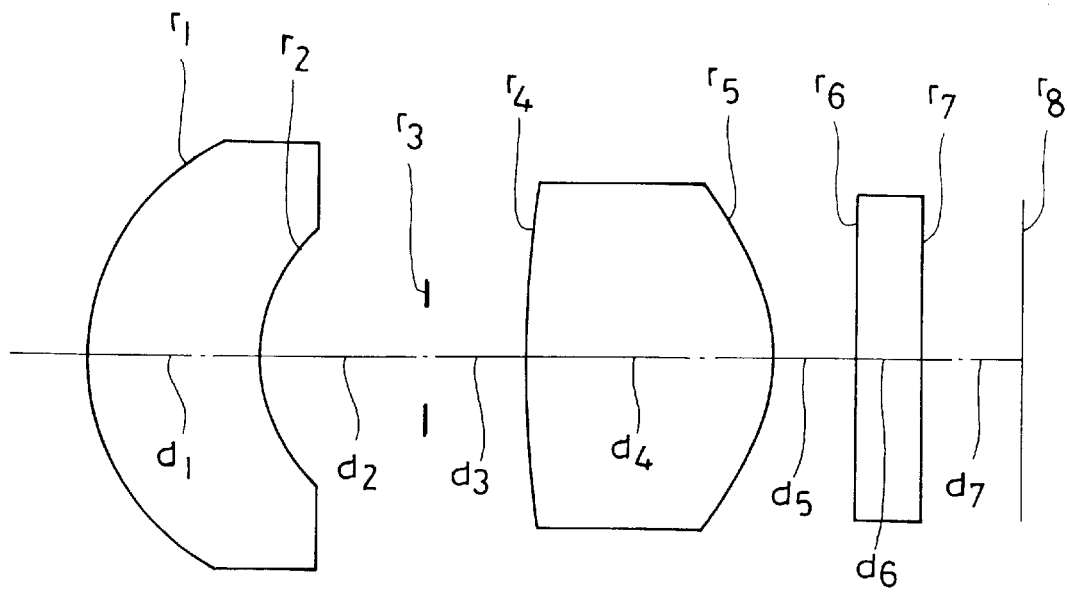

The eighteenth embodiment has a composition illustrated in FIG. 18, or is composed, in order from the object side, of a negative lens component and a positive lens component, and comprises a stop disposed between the negative lens component and the positive lens component. Speaking more concretely, the eighteenth embodiment is composed, in order from the object side, of a first meniscus lens component having a concave surface on the image side, a stop and a second biconvex lens component: the first lens component being a radial type gradient index lens component. In this embodiment, the first lens component has a function mainly for widening a field angle and the second lens component has a main imaging function. Further, a plane parallel plate C is disposed as a cover glass plate.

In this embodiment, lateral chromatic aberration produced by the lens system as a whole in particular is corrected favorably by disposing, at a location on the object side of the stop, a radial type gradient index lens component which produces chromatic aberration and has a negative refractive power. Further, offaxial aberrations are favorably corrected by configuring the first lens component so as to have the meniscus shape. In particular, amounts of offaxial aberrations are reduced by configuring the first lens component so as to have a concave surface on the stop side. Further, amounts of aberrations are reduced by configuring the second lens component so as to have a biconvex shape, thereby sharing a refractive power between these two convex surfaces.

Figure 19:
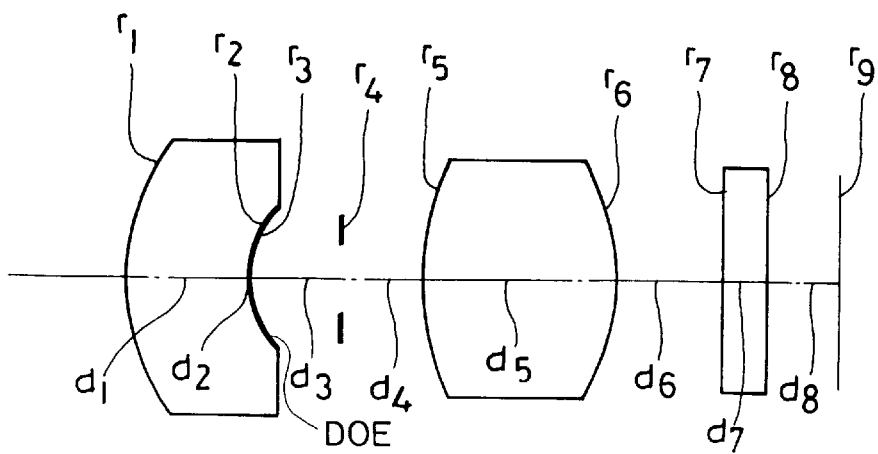

The nineteenth embodiment is composed, in order from the object side, of a negative lens component and a positive lens component as shown in FIG. 19. Speaking in more details, the nineteenth embodiment is an optical system which is composed of a first meniscus lens component which has a concave surface on the image side and a function to widen a field angle, a stop and a second lens component which has a biconvex shape and a main imaging function.

The nineteenth embodiment has a composition similar to that of the eighteenth embodiment but uses a diffraction type optical element in place of the radial type gradient index lens component for favorably correcting aberrations.

Though it is rather hard to correct offaxial aberrations in the ninteenth embodiment which has an asymmetrical refractive power arrangement wherein a negative refractive power and a positive refractive power are distributed on both side of the stop, lateral chromatic aberration in particular is corrected favorably by using the diffraction type optical element (DOE) on the object side of the stop. Further, coma and distortion in particular are corrected favorably by using an aspherical surface, on the second positive lens component which has such a shape as to weaken a positive refractive power as portions of the aspherical surface are farther from an optical axis in the radial direction. Furthermore, amounts of offaxial aberrations in particular are reduced by configuring the first negative lens component so as to have a meniscus hsape having a concave surface on the side aberrations are rover, amounts of aberrations are reduced by configuring the second lens component so as to have a biconvex shape, thereby sharing a refractive power between two convex surfaces. In addition, diffraction efficiency is enhanced by forming the diffraction type optical element (DOE) on the surface of the first lens component which is concave toward the stop, thereby reducing a difference between angles of incidence of an axial light bundle and an offaxial light bundle on the diffraction type optical element.

The optical system according to the present invention is used as an optical system for silver salt camera, video cameras and so on. FIGS. 23 through 29 are diagrams showing conditions where the optical system according to the present invention is applied to a variety of appliances.

Figure 23:
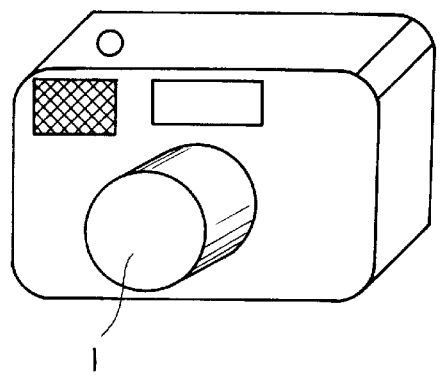
FIG. 23 is a perspective view schematically showing a silver salt camera using the optical system according to the present invention.

A condition where the optical system according to the present invention is applied to a silver salt camera is schematically shown in FIG. 23, wherein a reference numeral 1 represents the optical system according to the present invention.

Figure 24:
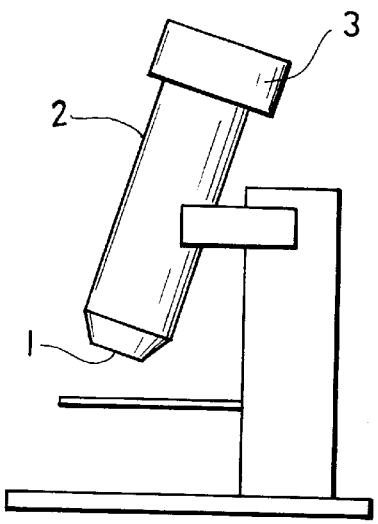
FIG. 24 is a sectional view schematically showing a microscope using the optical system according to the present invention.

A condition where the optical system according to the present invention is applied as an objective lens system for a microscope is schematically shown in FIG. 24, wherein a reference numeral 1 designates the optical system according to the present invention. Further, a reference numeral 2 denotes a microscope tube, comprising an imaging lens system and a reference numeral 3 represents an eyepiece.

Figure 25:
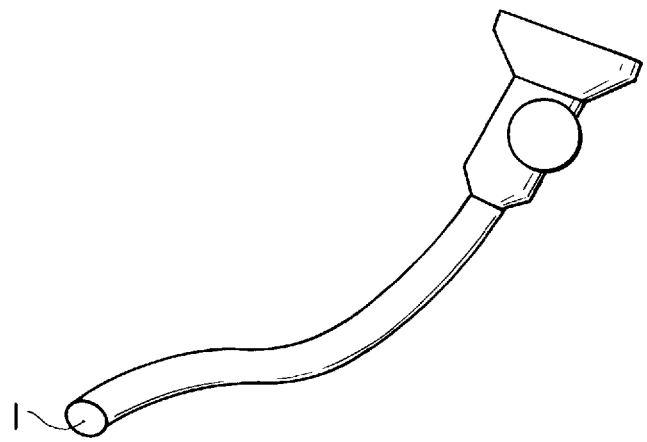
FIG. 25 is a perspective view schematically showing an endoscope using the optical system according to the present invention.

A condition where the optical system according to the present invention is applied to an endoscope is schematically shown in FIG. 25, wherein a reference numeral 1 represents an objective optical system using the optical system according to the present invention.

Figure 26:
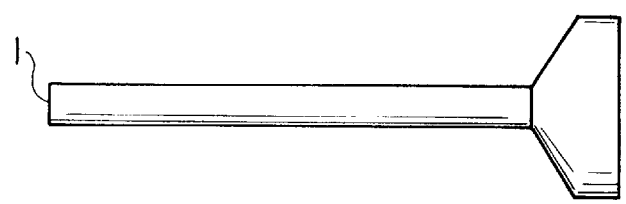
FIG. 26 is a sectional view schematically showing a non-flexible endoscope using the optical system according to the present invention.

A condition where the optical system according to the present invention is applied to a non-flexible endoscope is schematically presented in FIG. 26, wherein a reference numeral 1 represents an objective optical system which uses the optical system according to the present invention and is disposed in a distal end.

Figure 27:
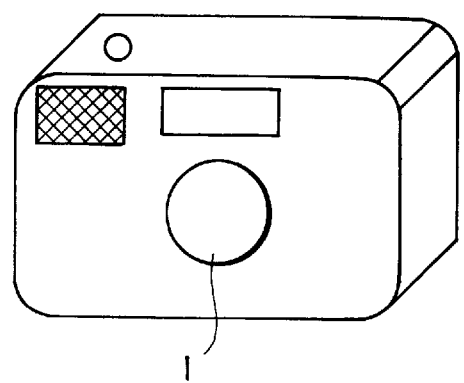
FIG. 27 is a perspective view schematically showing a video camera using the optical system according to the present invention.

A condition where the optical system according to the present invention is applied to a video camera is schematically presented in FIG. 27, wherein a reference numeral 1 designates an objective lens section using the optical system according to the present invention.

Figure 28:
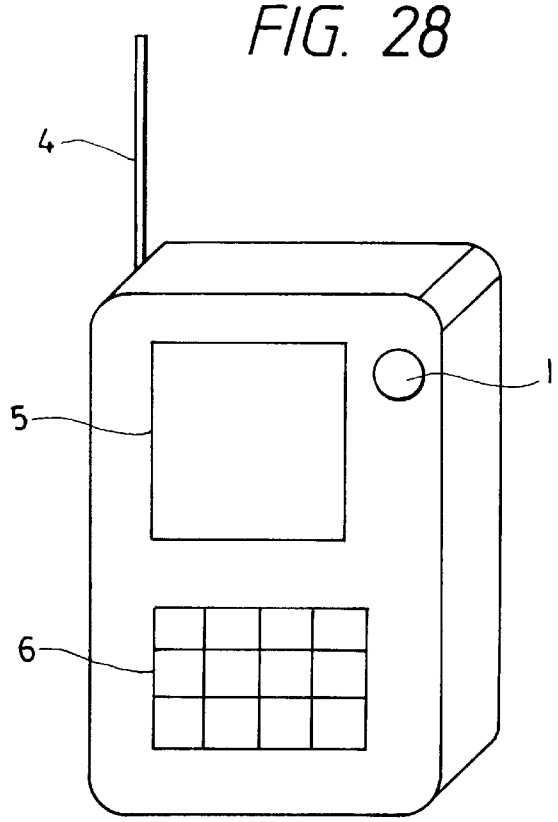
FIG. 28 is a perspective view schematically showing a portable TV telephone using the optical system according to the present invention.

A condition where the optical system according to the present invention is applied to a portable TV telephone is schematically shown in FIG. 28, wherein a reference numeral 1 designates an objective lens section using the optical system according to the present invention. Further, a reference numeral 4 denotes an antenna for transmission and reception, a reference numeral 5 represents a display and a reference numeral 6 designates switches.

Figure 29:
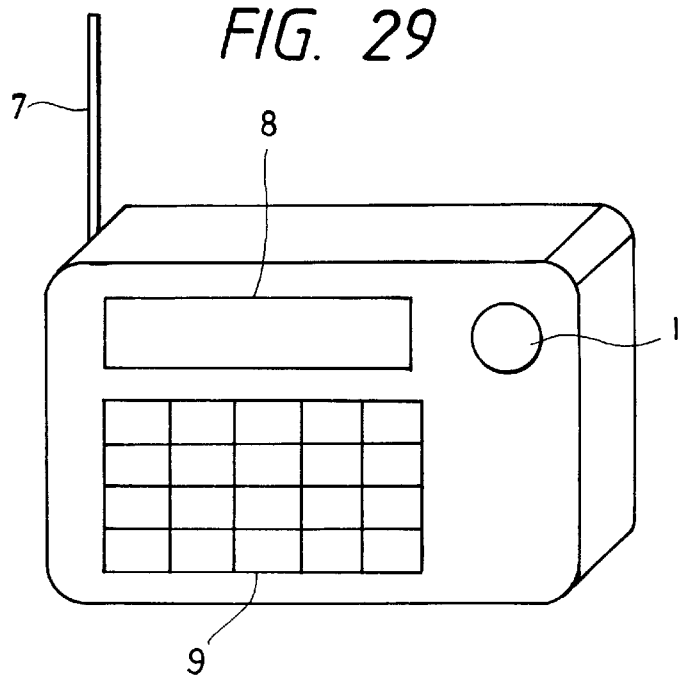
FIG. 29 is a perspective view schematically showing a portable information input unit using the optical system according to the present invention.

A condition where the optical system is applied to a portable information input unit is schematically shown in FIG. 29, wherein a reference numeral 1 represents the optical system according to the present invention. Further, a reference numeral 7 designates an antenna for transmission and reception, a reference numeral 8 designates a display and a reference numeral 9 denotes switches.

The optical system according to the present invention corrects chromatic aberration extremely favorably by selecting adequately a radial type refractive index distribution and variation of a value of refractive index of a medium dependent on wavelength.

What is claimed is:

1. An optical system comprising: at least one radial type gradient index lens which has a refractive index distribution from an optical axis in a radial direction in a medium thereof, wherein said optical system satisfies the following condition when a gradient of the refractive index distribution of said radial type gradient index lens component is different dependently on wavelengths:

$$\Delta\theta_{gF} < 5 \qquad (1)$$

wherein the reference symbol $\Delta\theta_{gF}$ represents a value given by the following formula (b):

$$\Delta\theta_{gF} = |\theta_{gF}(D_e) - \theta_{gF}(0)| \qquad (b)$$

wherein the reference symbols $\theta_{gF}(D_e)$ and $\theta_{gF}(0)$ represent an effective diameter of said radial type gradient index lens component ($r=D_e$) and a partial dispersion ratio on an optical axis ($r=0$) respectively when a partial dispersion ratio at a point located at a radial distance of r is expressed by the following formula (c):

$$\theta_{gF}(r) = |n_g(r) - n_F(r)|/|n_F(r) - n_C(r)| \qquad (c)$$

wherein the reference symbol $n_g(r)$, $n_F(r)$ and $n_C(r)$ represent refractive indices at the point located at the radial distance of r for the g-line, F-line and C-line respectively.

2. An optical system according to claim 1 satisfying the following condition (1-1):

$$\Delta\theta_{gF} < 0.5 \qquad (1\text{-}1).$$

3. An optical system according to claim 1 satisfying the following condition (3):

$$-2 < 1/V_1(g) < 2 \qquad (3)$$

wherein the reference symbol $V_1(g)$ represents a value which expresses dispersion considering the g-line and is given by the following formula (f-1) in which i has a value of 1:

$$V_1(g) = N_{id}/(N_{ig} - N_{iF}) \qquad (f\text{-}1)$$

wherein the reference symbols $N_{id}$, $N_{ig}$ and $N_{iF}$ represent distribution coefficients of the 2i'th order for the d-line, g-line and F-line respectively.

4. An optical system according to claim 1 satisfying the following condition (5):

$$-5 < 1/v_{egF} < 5 \qquad (5)$$

wherein the reference symbol $v_{egF}$ represents a value which is given by the following formula (j-2):

$$v_{egF} = V_0(g) \cdot V_1(g)/[(V_0(g) - V_1(g)) \cdot a + V_1(g)] \qquad (j\text{-}2)$$

wherein the reference symbols $V_0(g)$, $V_1(g)$ and a represent values which are expressed by the following formulae:

$$V_0(g) = (N_{0d} - 1)/(N_{0g} - N_{0F})$$

$$V_1(g) = N_{1d}/(N_{0g} - N_{0F})$$

$$a = \phi_m/(\phi_s + \phi_m)$$

wherein the reference symbols $N_{0d}$, $N_{0F}$ and $N_{0g}$ represent refractive indices on the optical axis for the d-line, F-line and g-line respectively, the reference symbols $N_{1d}$, $N_{1F}$ and $N_{1g}$ designate distribution coefficients of the second order for the d-line, F-line and g-line respectively, and reference symbols $\phi_s$ and $\phi_m$ denote refractive powers of surface and medium of a gradient index lens component.

5. An optical system according to claim 1 wherein one of a plurality of lens components is a radial type gradient index lens component.

6. An optical system according to claim 1 wherein two of a plurality of lens components are radial type gradient index lens components.

7. An optical system according to claim 2 satisfying the following condition (3-1):

$$-0.5 < 1/V_1(g) < 0.5 \qquad (3\text{-}1)$$

wherein the reference symbol $V_1(g)$ represents a value which expresses dispersion considering the g-line and is given by the following formula (f-1) in which i has a value of 1:

$$V_1(g) = N_{id}/(N_{ig} - N_{iF}) \qquad (f\text{-}1)$$

wherein the reference symbols $N_{id}$, $N_{ig}$ and $N_{iF}$ represent distribution coefficients of the 2i'th order for the d-line, g-line and F-line respectively.

8. An optical system comprising: a radial type gradient index lens component which has a refractive index distribution in a radial direction from an optical axis in a medium thereof, wherein said optical system satisfies the following condition (3) when a gradient of the refractive index distribution of said radial type gradient index lens component is different dependently on wavelengths:

$$-2 < 1/V_1(g) < 2 \qquad (3)$$

wherein the reference symbol $V_1(g)$ represents a value which expresses dispersion considering the g-line and is given by the following formula (f-1) in which i has a value of 1:

$$V_1(g) = N_{id}/(N_{ig} - N_{iF}) \qquad (f\text{-}1)$$

wherein the reference symbols $N_{id}$, $N_{ig}$ and $N_{iF}$ represent distribution coefficients of the 2i'th order for the d-line, g-line and F-line respectively.

9. An optical system according to claim 8 satisfying the following condition (5):

$$-5 < 1/v_{egF} < 5 \qquad (5)$$

wherein the reference symbol $v_{egF}$ represents a value which is given by the following formula (j-2):

$$v_{egF}=V_0(g)\cdot V_1(g)/[(V_0(g)-V_1(g))\cdot a+V_1(g)] \qquad (j\text{-}2)$$

wherein the reference symbols $V_0(g)$, $V_1(g)$ and a represent values which are expressed by the following formulae:

$$V_0(g)=(N_{0d}-1)/(N_{0g}-N_{0F})$$

$$V_1(g)=N_{1d}/(N_{0g}-N_{0F})$$

$$a=\phi_m/(\phi_s+\phi_m)$$

wherein the reference symbols $N_{0d}$, $N_{0F}$ and $N_{0g}$ represent refractive indices on the optical axis for the d-line, F-line and g-line respectively, the reference symbols $N_{1d}$, $N_{1F}$ and $N_{1g}$ designate distribution coefficients of the second order for the d-line, F-line and g-line respectively, and reference symbols $\phi_s$ and $\phi_m$ denote refractive powers of surface and medium of a gradient index lens component.

10. An optical system according to claim 8 wherein one of a plurality of lens components is a radial type gradient index lens component.

11. An optical system according to claim 8 wherein two of a plurality of lens components are radial type gradient index lens components.

12. An optical system comprising: a radial type gradient index lens components which has a refractive index distribution in a radial direction from an optical axis in a medium thereof, wherein said optical system satisfies the following condition (5) when a gradient of the refractive index distribution of said radial type gradient index lens component is different dependently on wavelength:

$$-5<1/v_{egF}<5 \qquad (5)$$

wherein the reference symbol $v_{egF}$ represents a value which is given by the following formula (j-2):

$$v_{egF}=V_0(g)\cdot V_1(g)/[(V_0(g)-V_1(g))\cdot a+V_1(g)] \qquad (j\text{-}2)$$

wherein the reference symbols $V_0(g)$, $V_1(g)$ and a represent values which are expressed by the following formulae:

$$V_0(g)=(N_{0d}-1)/(N_{0g}-N_{0F})$$

$$V_1(g)=N_{1d}/(N_{0g}-N_{0F})$$

$$a=\phi_m/(\phi_s+\phi_m)$$

wherein the reference symbols $N_{0d}$, $N_{0F}$ and $N_{0g}$ represent refractive indices on the optical axis for the d-line, F-line and g-line respectively, the reference symbols $N_{1d}$, $N_{1F}$ and $N_{1g}$ designate distribution coefficients of the second order for the d-line, F-line and g-line respectively, and reference symbols $\phi_s$ and $\phi_m$ denote refractive powers of surface and medium of a gradient index lens component.

13. An optical system according to claim 12 satisfying the following condition (5-1):

$$-1<1/v_{egF}<1. \qquad (5\text{-}1).$$

14. An optical system according to claim 12 wherein one of a plurality of lens components is a radial type gradient index lens component.

15. An optical system according to claim 12 wherein two of a plurality of lens components are radial type gradient index lens components.

16. An optical system comprising: two radial type gradient index lens components which have refractive index distributions in a radial direction from an optical axis in media thereof, wherein at least one of said radial type gradient index lens components satisfies the following condition (2-4):

$$-0.02<1/V_1<0.01 \qquad (2\text{-}4)$$

wherein the reference symbol $V_1$ represents a value given by the following formula:

$$V_1=N_{1d}/(N_{1F}-N_{1C})$$

wherein the reference symbols $N_{1d}$, $N_{1F}$ and $N_{1C}$ represent distribution coefficients of the second order for the d-line, F-line and C-line respectively.

17. An optical system according to claim 16 wherein at least one surface is planar.

18. An image pickup apparatus using an optical system as claimed in any one of claims 1, 8, 12, and 16.

\* \* \* \* \*